United States Patent [19]
Raymond

[11] 3,769,944
[45] Nov. 6, 1973

[54] ROTARY ENGINE
[75] Inventor: Charles Raymond, Berkeley, Calif.
[73] Assignee: Redskin Engines Company, Berkeley, Calif.
[22] Filed: May 8, 1972
[21] Appl. No.: 250,884

Related U.S. Application Data
[63] Continuation-in-part of Ser. No. 197,449, Nov. 10, 1971, abandoned.

[52] U.S. Cl............... 123/8.35, 123/8.41, 418/106, 418/138, 418/193, 418/195
[51] Int. Cl........ F02b 53/06, F01c 1/08, F03c 3/00
[58] Field of Search................ 123/8.23, 8.35, 8.41; 418/106, 193, 195, 219, 138

[56] References Cited
UNITED STATES PATENTS

| | | | |
|---|---|---|---|
| 174,373 | 3/1876 | Maxson............................. | 418/195 |
| 763,982 | 7/1904 | Jahn, Jr. ........................... | 418/193 |
| 2,101,051 | 12/1937 | Cuny............................. | 418/195 X |
| 2,101,428 | 12/1937 | Cuny............................. | 418/195 X |
| 2,691,349 | 10/1954 | Cuny............................. | 418/219 X |
| 3,101,700 | 8/1963 | Bowdish........................ | 418/193 X |

Primary Examiner—Allan D. Herrmann
Attorney—Paul D. Flehr et al.

[57] ABSTRACT

A rotary engine for use as a fluid pump or motor, gas compressor or vacuum pump, or internal combustion engine with improved performance and reduced exhaust emissions as compared to conventional engines. The rotary engine provides a cycle of alternately expanding and contracting volumes through purely rotational movement in certain embodiments, or through precessional-type movement in other embodiments. In one embodiment a stator element is formed with side walls which define an annular cavity through which primary and secondary rotors are adapted to turn with conjoint angular velocities about intersecting axes disposed at a predetermined oblique angular relationship. One or more vanes project into the cavity and are slidably fitted in cylindrical seals which accommodate relative swivel motion between the vanes and rotors throughout a full cycle of rotation. Inlet means is provided to direct the working fluid or a combustible charge into selected portions of two diametrically and axially opposed chambers, and outlet means is provided to direct the fluid or exhaust gasses from the chambers. In the internal combustion engine embodiment valve means is provided adjacent one vane to direct a compressed charge from the trailing portion of one chamber across to the leading portion of an opposite chamber where combustion occurs. In another embodiment a disc is mounted for precessional-type movement within a stator carrying one or more fixed vanes, with a power shaft rotatably mounted relative to the stator about a first axis, and with this shaft rotatably mounted relative to the disc about a second axis obliquely intersecting the first axis.

48 Claims, 29 Drawing Figures

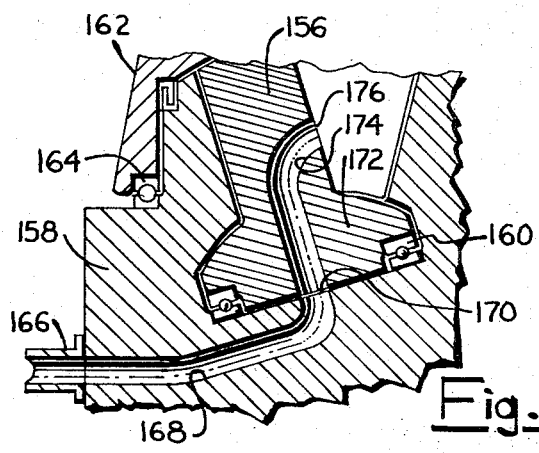
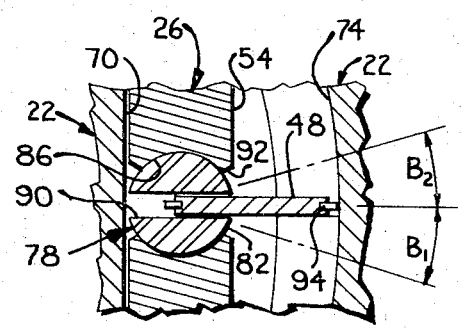
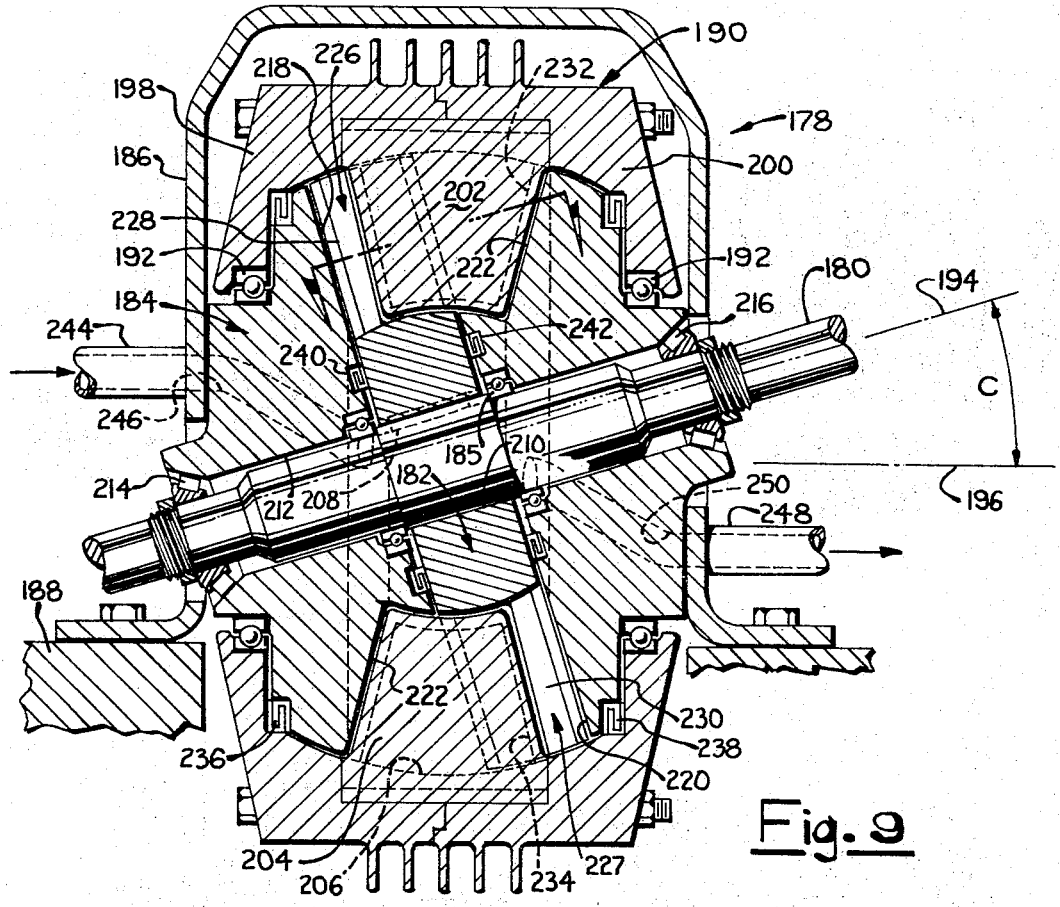

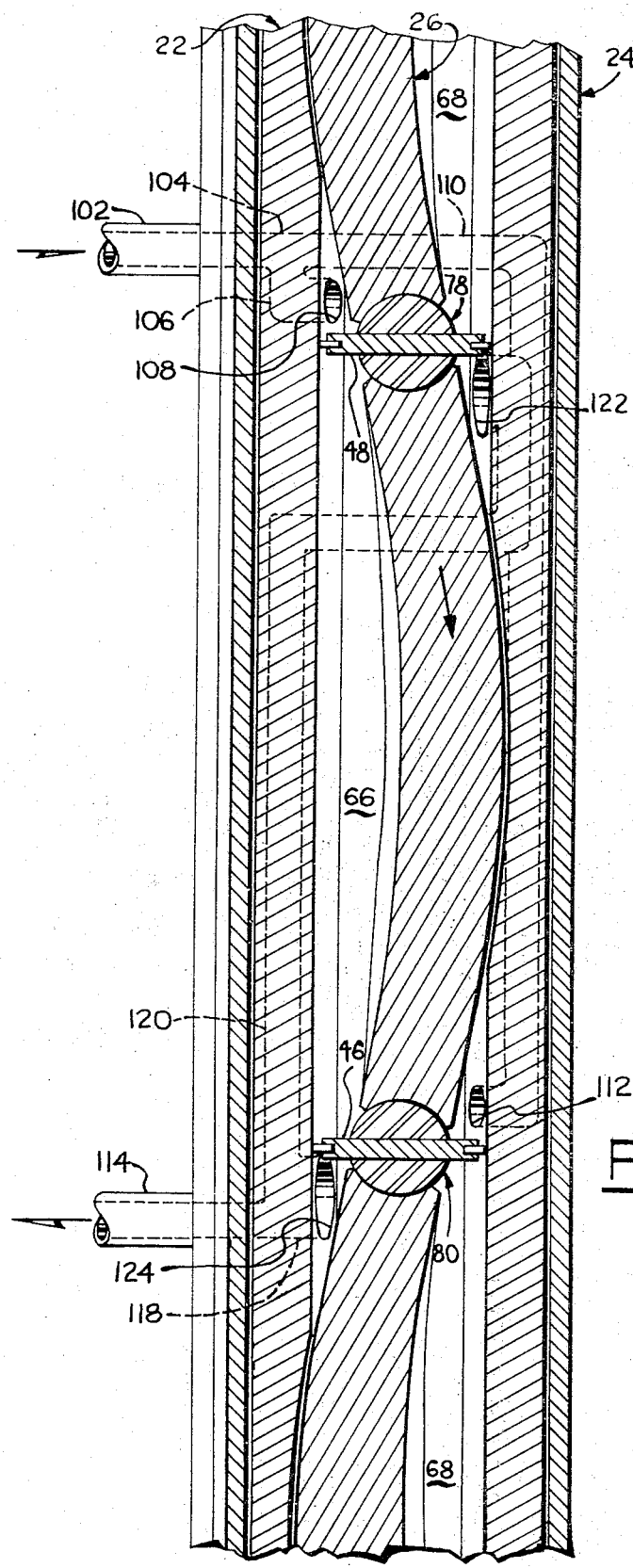
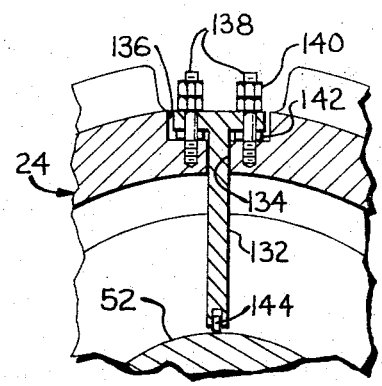
Fig. 5
Fig. 6

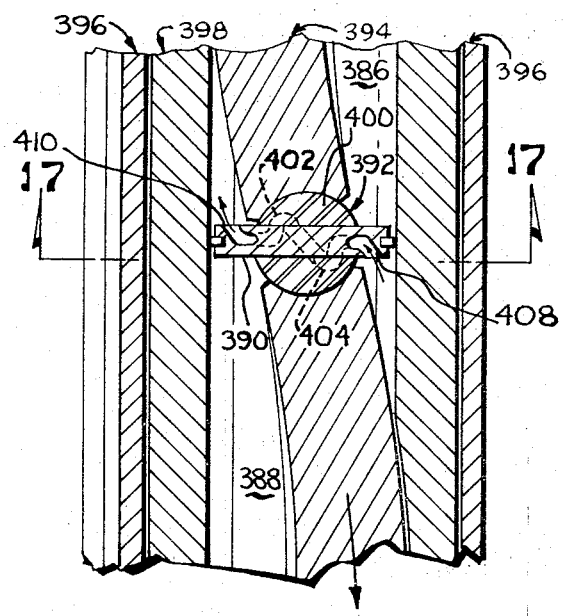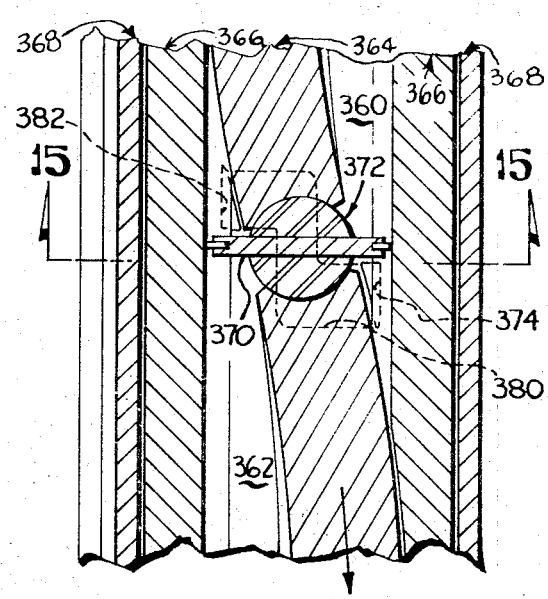
Fig. 18     Fig. 16
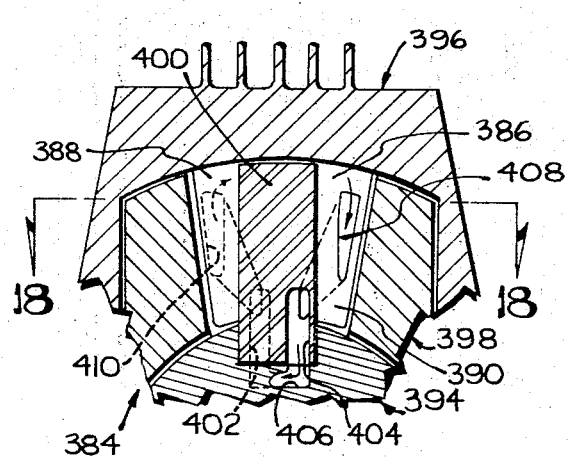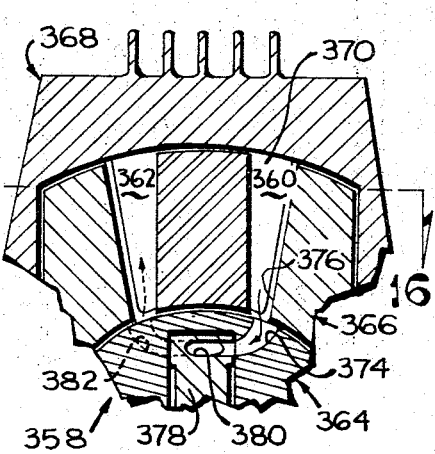
Fig. 17     Fig. 15

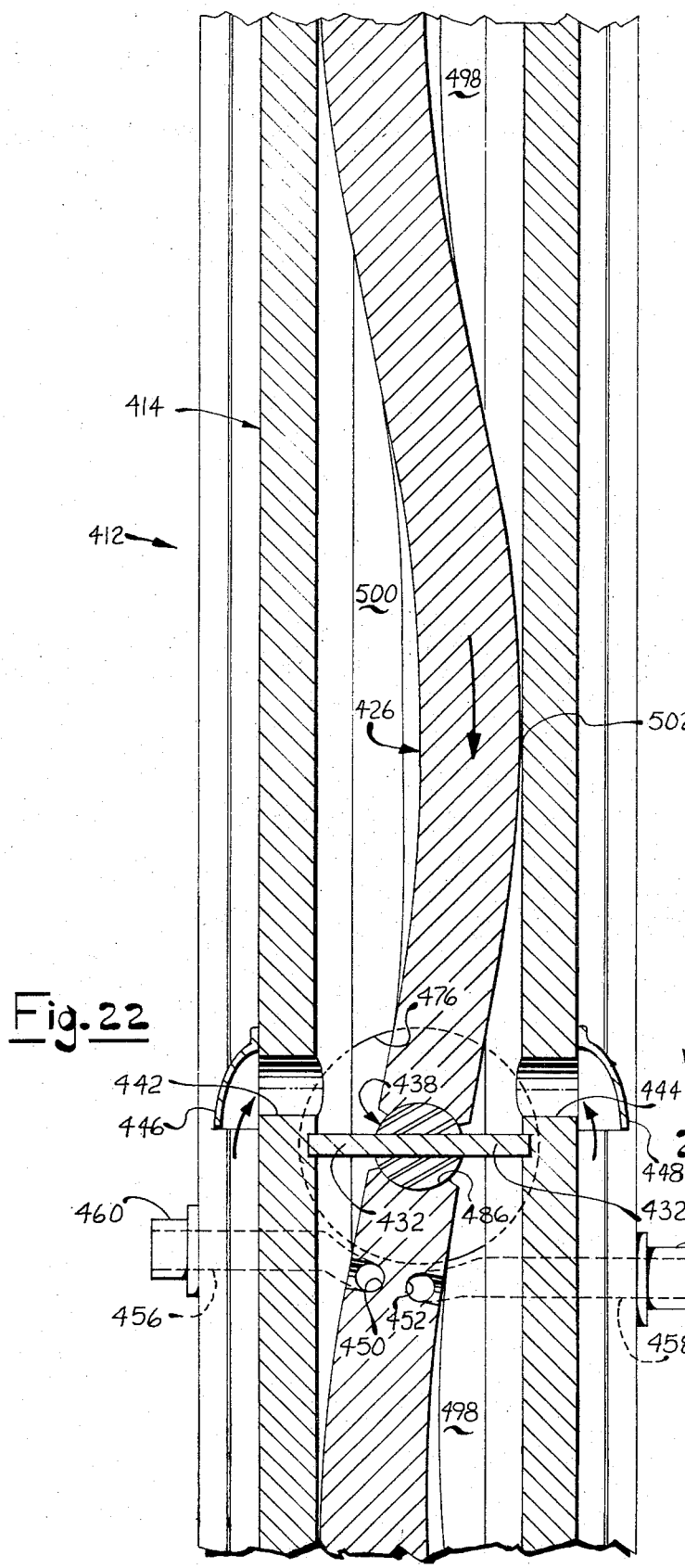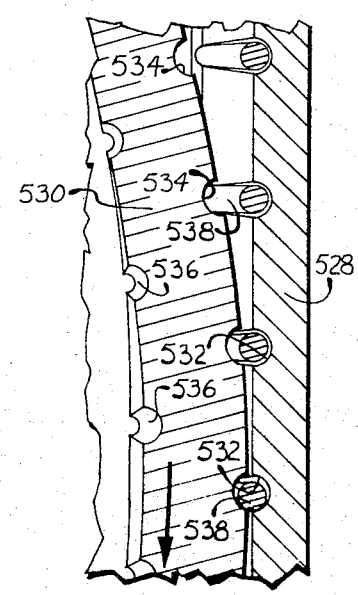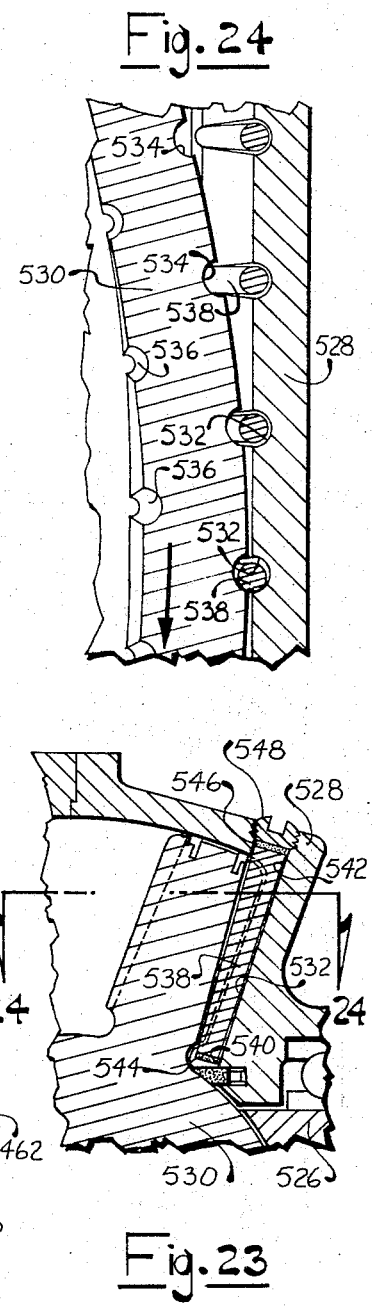

ROTARY ENGINE

CROSS-REFERENCE TO RELATED APPLICATION

This is a continuation-in-part of application Ser. No. 197,449 filed Nov. 10, 1971, and now abandoned.

BACKGROUND OF THE INVENTION

This invention relates in general to rotary engines, and in particular relates to improvements in rotary engines adapted for use as a fluid pump or motor, gas compressor or vacuum pump, or internal combustion engine.

There has been an increasing recognition of the disadvantages and limitations of conventional reciprocating piston engines, especially when viewed in comparison to rotary engines. It is recognized that reciprocating piston engines are relatively inefficient, have relatively unfavorable power-to-weight and torque characteristics, require the burning of relatively high octane fuels, emit a considerable amount of harmful exhaust pollutants, and have a relatively short life in view of vibration, wear and lubrication problems.

A number of rotary engine designs have been proposed in an attempt to solve the problems inherent in conventional reciprocating piston engines. Considerable activity has developed recently in this field for the internal combustion form of these rotary engines as a result of the serious air pollution resulting from conventional piston engines. Various forms of rotary engines have developed to duplicate the usual intake-compression-power-exhaust cycle. Among these prior art rotary engines are the eccentric rotor engines, such as the Wankel engine in which a rotor moves about a fixed gear within a trochoidal stator and with power delivered through an eccentric drive. Other types of rotary engines include those known as cat-and-mouse engines in which pistons travel in a circular path, multiple rotor engines employing two intermeshing rotors which turn about parallel axes, and revolving block engines which combine reciprocating piston motion with rotational motion of the engine block. However, each of the foregoing rotary engine designs have certain drawbacks or limitations. For example, the eccentric rotor engines present problems in cooling the elements and in sealing the engine chambers. The need has therefore been recognized for an improved rotary engine of simplified design which eliminates or reduces the many inherent problems of existing engines of both reciprocating piston and rotary engine design, which is adapted for many different types of commercial applications, and which will substantially reduce harmful exhaust emissions for internal combustion engine applications.

OBJECTS AND SUMMARY OF THE INVENTION

It is a general object of the invention to provide an improved rotary engine adapted for use in different embodiments as a fluid pump/motor, gas compressor or vacuum pump, or internal combustion engine.

Another object is to provide an improved rotary engine of the character described in which first and second rotor elements are mounted for rotation about angularly disposed, intersecting axis within a cavity formed in a stator and with a vane or vanes carried on one of the rotor elements so that conjoint rotation of the rotor elements relative to the stator causes the volumes defined in opposed chambers to alternately expand and contract.

Another object is to provide a rotary engine of the character described in which a disc is mounted for processional-type movement within a stator carrying one or more fixed vanes, a power shaft is rotatably mounted within the stator about a first axis, and this shaft is rotatably mounted relative to the disc about a second axis obliquely intersecting the first axis.

Another object is to provide a rotary engine of the character described for use in internal combustion cycling in which valve means is provided to control the flow of the compressed charge between chambers and is actuated in different embodiments responsive to the relative position assumed by the stator and rotor elements as they rotate throughout a complete cycle.

Another object is to provide a rotary engine of the character described which includes means for effectively sealing the engine's working chambers.

The foregoing and additional objects and features of the invention are provided by stator and rotor elements arranged either to achieve purely rotary motion in certain embodiments, or precessional-type motion in other embodiments. In the embodiment having purely rotary motion two rotor elements are mounted for conjoint rotation about axes which intersect at a predetermined oblique angular relationship. In one embodiment an outer rotor carries at least one vane which projects into a stator cavity to define expanding and contracting volumes within diametrically opposed chambers. In another embodiment the outer rotor itself defines the chamber walls. Means is provided to form a swivel connection and seal between the vane and inner rotor to accommodate relative movement throughout rotation of the elements. Inlet and outlet means are provided to admit and discharge fluid into respective expanding and contracting volumes of the two chambers for the fluid pump/motor or gas compressor and vacuum pump embodiments. In the internal combustion embodiments inlet means is provided to direct a charge into the expanding volume of one chamber for the intake phase, valve means is provided to direct the compressed charge from the contracting volume of the first chamber following the compression phase to the expanding volume of the opposite chamber, ignition means then ignites the compressed and transferred charge for the power phase, and outlet means exhausts the spent gasses from the contracting volume of the opposite chamber for the exhaust phase. The valve means comprises in several embodiments either a one-way flow valve, or a positive action valve opening and closing responsive to the relative positions assumed between the stator and rotor elements throughout a complete cycle. A power shaft is connected in different embodiments to either of the rotor elements, or power may be delivered through a suitable connection with the outer rotating surface of the outer rotor, as by a belt drive.

The embodiment of the invention which achieves purely rotary motion of the elements (acting as a positive displacement turbine) affords important advantages over existing designs. For example, friction losses are lower, vibration is reduced, sealing is simplified, and the design simplicity leads to reduced costs in construction, operation and maintenance. The design is such that for internal combustion applications the intake and compression side remains relatively cooler during operation permitting the use of lubricants and plastic or metal seals having low friction and improved sealing properties. Thus, the moving surfaces may be lubricated without the introduction of the lubricant into the firing chamber, which otherwise would cause pollution. Depending upon the design parameters such as the oblique angular relationship between the rotor axes the volumes within the chambers can be varied over a range for a given size engine. In addition, a wide range of compression ratios is available depending upon the design parameters. The internal combustion engine embodiment provides an improved power-to-weight ratio and favorable torque characteristics as compared to conventional engines. Primarily because of the absence of reciprocating parts the torque curve does not have the upper RPM limit bounded by an exponential friction curve as in conventional engines, allowing this rotary engine to run at extremely high speeds with minimal leakage or sealing losses. A highly important advantage to the invention lies in the substantial reduction in the emission of harmful exhaust pollutants, since both the mechanical and thermal efficiencies are much higher as a result of factors which include lower friction, longer power stroke than the intake-compression stroke, less heat loss to the engine, more homogeneous temperature distribution in the combustion zone allowing less surface-held unburned hydrocarbons, less requirement for leaded fuels, and the combustion forces act directly on the rotating members in the torque direction.

In the embodiment of the invention characterized in employing precessional-type motion a stator forms a cavity and carries one or more inwardly projecting vanes. A disc is mounted for precessional-type motion within the cavity to define expanding and contracting volumes, with swivel seal means provided between the vane and disc. A power input/output shaft is rotatably mounted within the stator about a first axis, and the shaft is rotatably mounted relative to the disc about a second axis obliquely intersecting the first axis. Fluid inlet and outlet means are provided, and for gas compressor applications check valve means is provided to control gas flow.

BRIEF DESCRIPTION OF THE DRAWINGS

FIG. 4 is a fragmentary sectional view taken along the line 4—4 of FIG. 2;

FIG. 5 is a schematic developmental view for the rotary engine of FIGS. 1-4 illustrating the interrelationship of the elements creating expanding and contracting volumes within the engine;

FIG. 6 is a fragmentary cross-sectional view of an embodiment providing removable, radially adjustable vanes;

FIG. 8 is a fragmentary cross sectional view of another embodiment of the engine of FIG. 1 illustrating details of another fluid valving arrangement;

FIG. 9 is an axial cross sectional view of an embodiment of the invention in which a through shaft turns with the primary rotor;

FIG. 15 is a fragmentary axial sectional view of another embodiment of the invention illustrating details of a valving arrangement;

FIG. 16 is a developmental sectional view taken along the line 16—16 of FIG. 15;

FIG. 17 is a fragmentary axial sectional view of another embodiment of the invention illustrating details of a valving arrangement;

FIG. 18 is a developmental sectional view taken along the line 18—18 of FIG. 17;

FIG. 22 is a developmental view partially in section taken along the line 22—22 of FIG. 19;

FIG. 23 is a fragmentary sectional view of an embodiment providing a chamber sealing arrangement for an engine of the type shown in FIG. 19;

FIG. 24 is a sectional view taken along the line 24—24 of FIG. 23;

DESCRIPTION OF THE PREFERRED EMBODIMENTS

Figure 1:
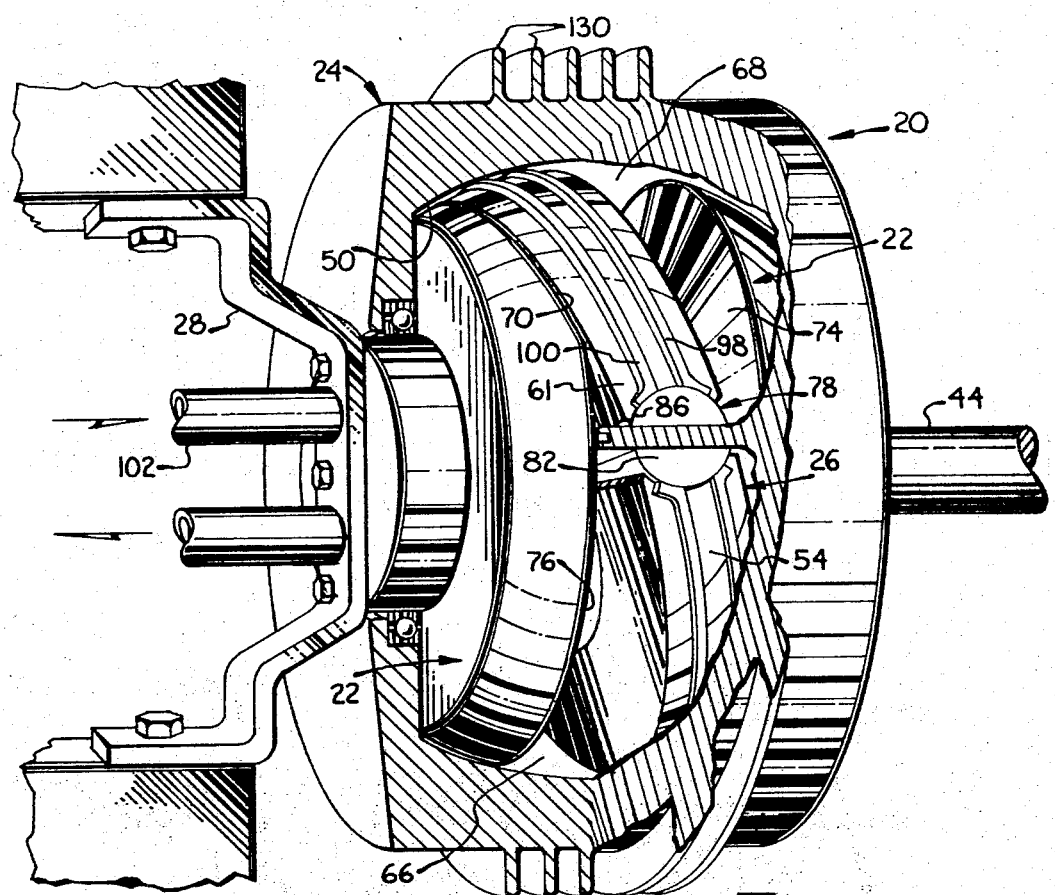
FIG. 1 is a cut-away perspective view of a rotary fluid engine embodiment of the invention.

In the drawings FIG. 1 illustrates a rotary engine 20 of the invention comprising an embodiment adapted for use as a fluid pump/motor, gas compressor, or vacuum pump. Engine 20 includes three principal elements comprising a first element or stator 22, a second element or secondary ring rotor 24, and a third element or primary rotor 26. The two rotor elements 24, 26 are mounted for conjoint rotation with respect to the fixed stator 22, which is anchored to a suitable base support 28. While this embodiment will be described in terms of such a fixed stator carrying the moving rotors, it is understood that the invention also encompasses a rotary engine of the described nature in which the second element is anchored to a base support with the first element adapted to undergo rotary movement, or in which all three elements are adapted to move on a free turning mount for counter rotation.

Figure 2:
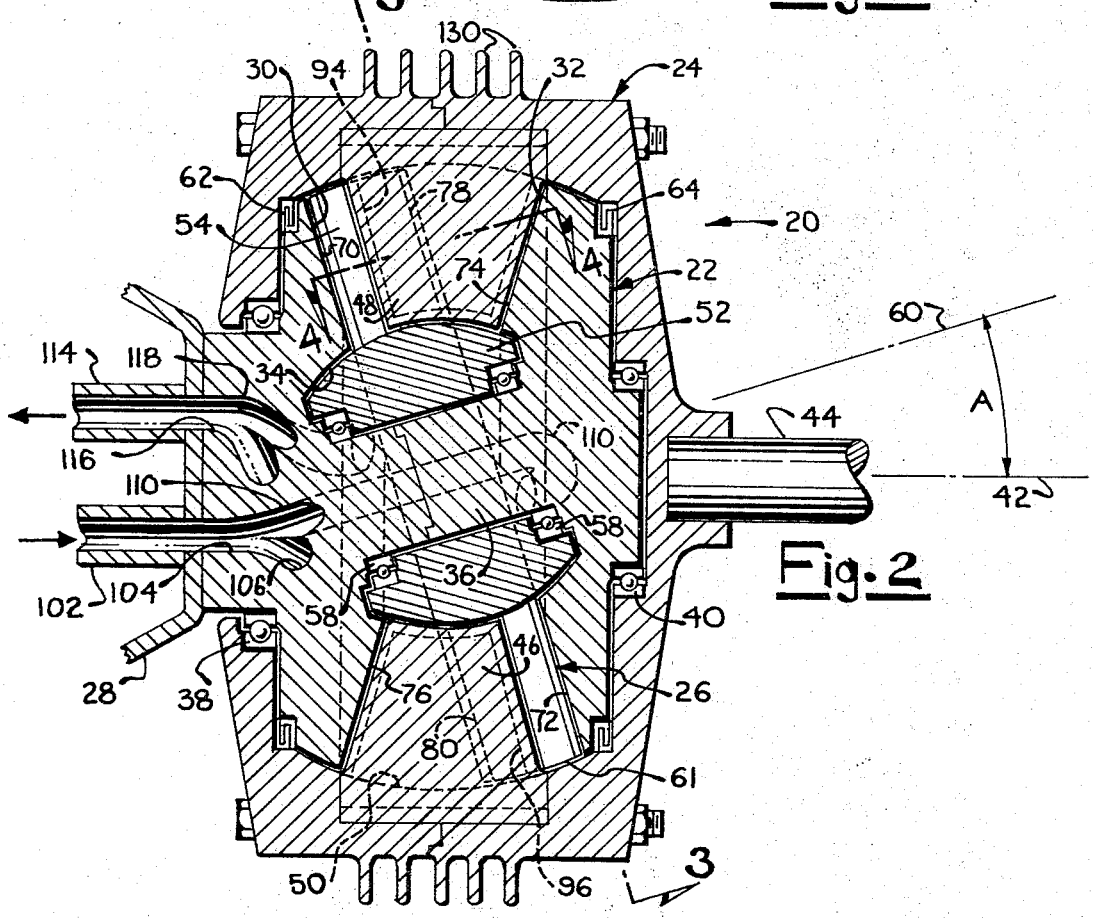
FIG. 2 is an enlarged axial sectional view of the rotary engine of FIG. 1.

As best illustrated in FIG. 2 stator 22 extends outwardly from the fixed base 28 to provide end-wise support for the remaining engine elements. The stator is formed with an annular cavity defined between internal side walls 30, 32 extending radially outwardly from a flattened annular cavity 34 and axle portion 36.

Secondary rotor element 24 is formed into an open-ended shell structure mounted on the stator by suitable ball bearing assemblies 38, 40 for rotation about a first axis 42. A power input/output shaft 44 is mounted on the closed end of the secondary rotor concentric with axis 42. The secondary rotor carries partition means comprising a pair of diametrically opposed vanes 46, 48 which are mounted to the inner surface 50 of this rotor and project radially inwardly into the stator cavity. While a pair of vanes are illustrated, it will be understood that the invention contemplates the number of vanes could be greater than two with equal circumferential spacing, or only one vane could be provided, depending upon the desired number of volumes around the rotor. Inner surface 50 of the secondary rotor defines a truncated section of a spherical surface to accept the relative lateral sliding motion of primary rotor 26.

Primary rotor 26 includes an inner hub 52 and integral radially extending disc portion 54. Hub 52 is mounted by means of ball bearing assemblies 56, 58 on stator axle 36 for rotation about a second axis 60 which intersects the first axis 42 at a predetermined oblique angle A so that the two rotor elements turn in separate intersecting planes at the same angular velocity with respect to the stator. The output surface 61 of the disc portion defines a truncated section of a spherical surface to interfit in close-spaced relationship with the facing spherical surface 50 of rotor 24. A pair of suitable annular labyrinth type seals 62, 64 are provided between the stator end edges and the inner facing portions of the secondary rotor for sealing the stator cavity against fluid or gas leakage.

The angular disposition of primary rotor disc portion 54 within the cavity of the stator divides the same into two diametrically and axially opposed chambers 66, 68 (FIG. 1). The two chambers remain fixed in positional relationship with respect to the stator element, and the conjoint movement of the two rotor elements carrying the vanes through the chamber creates the expanding and contracting volumes therein in a manner to be presently described. The stator side walls 30, 32 are formed with respective diametrically opposed flat surfaces 70, 72 each defining annular sectors positioned in close-spaced relationship with the opposed rotating flat surface of a respective side of rotor disc 54. The remaining portions of the stator side walls are formed into diametrically opposed surfaces 74, 76 each defining truncated segments of a conical surface. The conical surface portions of the stator side walls provide close-spaced relative motion with respect to the radial edges of vanes 46, 48 moving through the chambers.

It is thus seen that the enclosed volumes of the two chambers are defined between the inner surface 50 of the second rotor element, the facing sector of the side surface of third element disc portion 54, and either of the stator conical surfaces 74, 76. Successive movement of the vanes 46, 48 as they are carried through the chambers causes the volumes defined in each chamber in front of vane movement to contract, while the volumes defined behind vane movement expand.

As the two rotor elements turn relative to the stator about their axes 42, 60, the vanes 46, 48 undergo a swivel movement relative to second element 24 about radially extending axes. Swivel seal means 78, 80 provide a swivel connection between the vanes and second and third elements to accommodate this relative swivel movement and at the same time provide a fluid-tight seal for containing the fluid or gasses within the chambers. The swivel seal means comprise cylinders 82, 84 seated within respective radially extending diametrically opposed bores 86, 88 formed in third rotor element disc portion 54.

As best illustrated in FIG. 4, the typical cylinder 82 is provided with a lateral slot 90 adapted to slidably receive the corresponding vane 48, and the rotor disc portion 54 is provided with enlarged slots 92 to accept the arc of swivel movement of the corresponding vane. It will be seen that as the two rotor elements turn throughout a complete cycle each vane undergoes two distinct movements. The first movement comprises a lateral sliding movement of the vane through the cylinder slot from, for example, the extreme lateral position with the vane midway through the chamber 68, as illustrated in FIG. 2, across through the slot to the extreme opposite position with the vane moved to a position midway through the opposite chamber 66, and then back to the first mentioned extreme position at the completion of the cycle. At the same time the relative movement of the two rotor elements 24, 26 causes the vane 48 and swivel cylinder 82 to pivot or swivel about a radial axis relative to disc portion 54 of the third element. This swivel action progresses from the perpendicular relationship between vane and rotor disc of FIG. 4 with the vane midway through chamber 68, through an angle $B_1$ as the vane and rotor elements rotate through an angle of 90° relative to the stator, back to the perpendicular vane position through the next quadrant of rotation with the vane disposed midway through the opposite chamber 66, through an angle $B_2$ as the vane and rotor elements turn through the next quadrant, and then back to the normal perpendicular vane position through the final quadrant of rotation for completion of the cycle.

The vane edges are sealed with respect to the stator side walls and third element hub 52 by means of suitable U-shaped seal elements 94, 96, which may be segmented, disposed in slots formed along each of the vane side edges and inwardly projecting edges. The radially straight portion of seals 94, 96 are only in contact with the stator conical surfaces 74, 76 as a respective side of each vane moves through a chamber. The axial width of each vane is sized to be less than the corresponding width of the stator cavity such that as each vane edge moves adjacent a facing flat stator surface 70 or 72 it will retreat from this surface into the slot 90 of the swivel seal connection. It is seen that the effective sealing contact between the stator and third rotor element 26 is projected over the entire area of flat surface 72. The wear on the seals 94, 96 is substantially reduced in that vane edge sealing contact occurs during only a part of vane travel through one complete cycle. The invention contemplates that vane width could substantially equal stator cavity width to provide continual vane edge sealing contact.

A pair of annular seals 98, 100 (FIG. 1) are provided to seal the outer spherical surface 61 of rotor disc portion 54 with respect to the inner spherical surface 50 of second rotor element 24. These seals may comprise segmented rings seated in annular grooves formed in the rotor disc portion. The segmented ring seals may be urged radially outwardly by suitable spring loading means into tight-fitting sealing relationship with the second rotor element. These seals are only required to undergo lateral sliding movement between the second and third rotor elements throughout a complete cycle of rotation and do not undergo high speed rotary contact inasmuch as the two rotors turn in conjoint angular relationship. Because the two vanes 46, 48 are secured to and project inwardly from the second rotor element 24 it is therefore not necessary to provide sealing means at the juncture of the vanes and second rotor element.

While the invention has been described in the embodiment of FIGS. 1–5 wherein the vanes are fixed for rotation with second rotor element 24, it is understood that the invention contemplates that the vanes could be fixed with respect to the third rotor element 26 and with a swivel connection provided between the second rotor and outer portion or root of each vane permitting the vanes to undergo the swivel movement throughout a complete turning cycle. Where an engine of the invention is utilized to develop power by the forces of expanding fluids or gasses within the chambers, it will be appreciated that the embodiment of FIGS. 1–5 provides a driving torque acting against the vanes and which is carried directly through to the second rotor element 24 and drive shaft 44 without being transferred across a swivel connection. FIG. 9 illustrates an embodiment in which the power output shaft is connected with the third rotor element which in turn is driven through the swivel seals by the fluid forces acting on vanes carried by the second rotor element.

It is to be noted that the relative swivel movement between the vanes and swivel seal connection with the third rotor element is purely a result of the geometry of the rotor elements as they turn through separate intersecting planes. There is no requirement for application of external forces, as by camming means, to turn the vanes through their swivel displacement.

The geometry of the elements of engine 20 may be selectively varied to provide any desired ratio between the expanding and contracting volumes of the chambers depending upon particular specifications and requirements. Thus, for an engine of given size the volumes of the chambers may be varied by varying the included angle A between the rotor axes 42, 60. An increase in the angle A will result in a corresponding increase in chamber volume for an engine of the same overall size and diameter.

Figure 3:
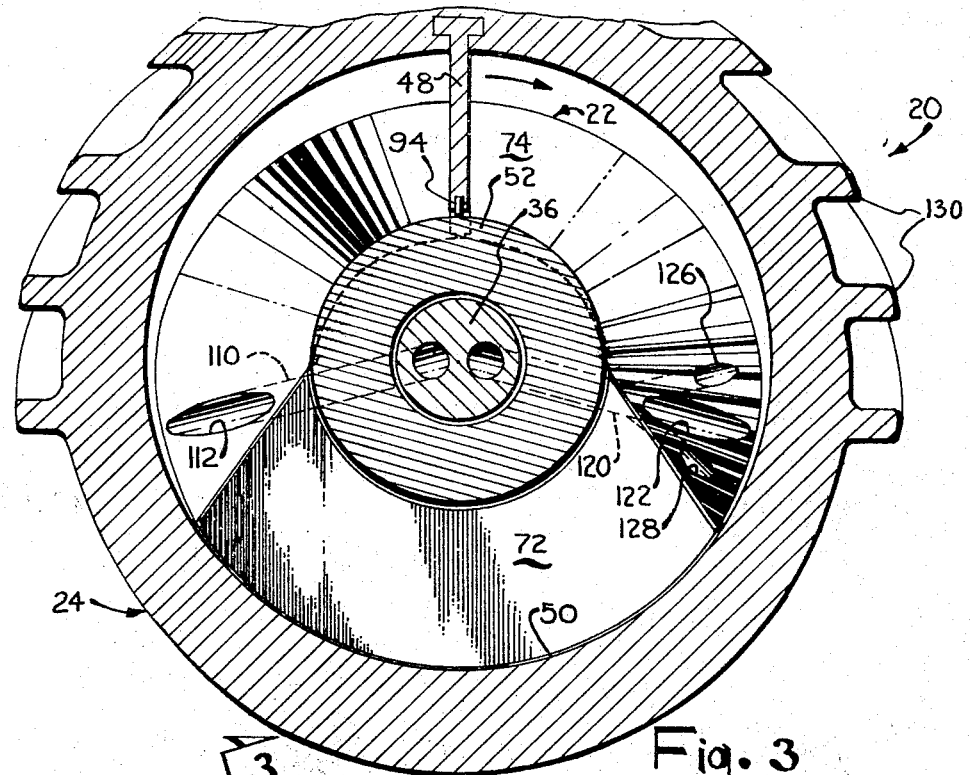
FIG. 3 is a cross sectional view taken along the line 3—3 of FIG. 2.

FIGS. 2, 3 and 5 illustrate details of the inlet and outlet means to introduce and discharge fluid into the chambers. The inlets and outlets are described in relation to a clockwise rotation of the two rotor elements as viewed in FIG. 3, and it will be realized that a reversal of the sense of rotation will reverse the direction of fluid movement. It will be noted that in the developed view of FIG. 5 the edge of the stator and second rotor elements are shown as straight while, for clarity, the third rotor element edge is shown as curved. The inlet means includes a main inlet conduit 102 connected with a branched passage or conduit 104 formed in stator element 22. Conduit 104 has a branch 106 leading to a port 108 opening into the leading portion of chamber 66. The inlet means further includes a branch 110 extending through the center of stator axle 36 with a reverse channel leading to port 112 opening into the leading portion of chamber 68. The outlet means includes a main outlet conduit 114 connected with branched outlet passage or conduit 116 formed in the stator. Conduit 116 includes a branch 118 opening into a port 124 in the trailing portion of chamber 66, and a branch 120 which extends through the stator axle 36 with a reverse channel leading to port 122 opening into the trailing portion of chamber 68.

The operation of the embodiment of FIGS. 1–5 is best illustrated in the developmental view of FIG. 5. The rotary engine 20 is used to provide a source of pressurized fluid, for example as a pump or gas compressor, by connecting the inlet conduit 102 with the source of fluid, such as an oil reservoir, and the outlet conduit 114 with the desired fluid system to be pressurized. Power from a suitable source is applied to shaft 44 for turning the primary and secondary rotor elements in a rotational sense from top to bottom as viewed in FIG. 5. As the diametrically opposed vanes 48, 46 sweep by the inlet ports 108, 112 and extend outwardly from the swivel seals, the volumes defined in the leading portions of the chambers 66, 68 expand so that fluid is inducted from the branch passages leading from inlet conduit 102. This proceeds so that a maximum volume of fluid is drawn into the two chambers, and continued revolution of the rotor elements then moves the vanes over the discharge ports 122, 124. The fluid is discharged under pressure from the chambers as the vanes trailing the fluid charge progressively advance in relation to the stator behind the inducted charge. The resulting contraction of the volumes of the trailing portions of chamber 66, 68 forces the fluid through the discharge ports exposed by the vanes and through discharge conduit 114. It will be seen that each of the two vanes act to push fluid ahead of the leading vane surface for the pressure phase while at the same time drawing in fluid behind the trailing vane surface for the suction phase. Reversal of the sense of rotation of the rotor elements affords automatic reversal of the inlet and outlet fluid flows. That is, conduit 114 becomes the suction inlet while conduit 102 becomes the pressure outlet.

The intake/exhaust porting arrangement may be widely varied for different applications. It is preferred, where the working fluid is an incompressible liquid, to arrange the exhaust ports 124, 122 so that they are exposed by the advancing vanes at the point of maximum volume of the fluid charge in the chambers. The positioning of the intake ports is critical to efficiency since it establishes the intake cutoff. To afford increased fluid exhaust capacity, additional exhaust port area may be provided such as by means of the auxiliary exhaust ports 126, 128 connected through branch passageways with the branch outlet passage 110, as shown in FIG. 3.

Where the rotary engine 20 is used as a gas compressor, or in other applications in which it would be ncessary to dissipate heat from the elements, a plurality of cooling fins 130 are provided around the outer periphery of secondary rotor 24. It will be seen that air cooling through the fins is assisted by the rotational movement of the fins with the secondary rotor.

FIG. 6 illustrates an embodiment of the invention providing removable and radially adjustable vanes 132. The vanes 132 are mounted within and project inwardly from lateral slots 134 formed in secondary rotor 24 at each vane position. Recessed seats 136 are formed in the outer surface of the secondary rotor on either side of the vane slots. Vane 132 is formed with a T-shaped head adapted to fit within the rotor seats 136. Suitable fastener means are provided to removably mount the vanes in position, and this fastener means may comprise the plurality of threaded studs 138 mounted into tapped holes in the secondary rotor and with lock nuts 140 turned onto the studs to lock the vanes in seated position. As required, one or more shims 142 may be provided to adjust the radial position of each vane and thereby provide a means for adjusting the clearance of the inner vane edge and its associated seal 144 with respect to the hub 52 of the primary rotor.

Figure 7:
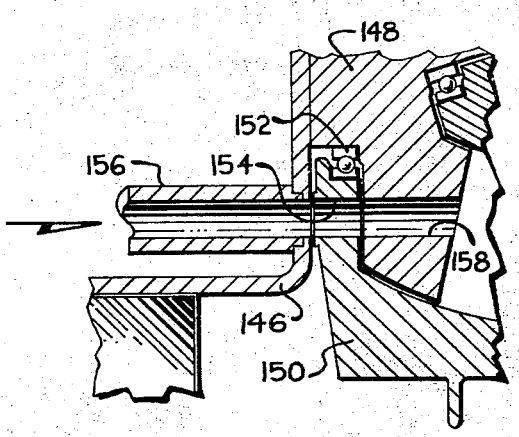
FIG. 7 is a fragmentary cut-away sectional view of another embodiment of the engine of FIG. 1 illustrating details of a fluid valving arrangement.

FIG. 7 illustrates an embodiment of the invention providing a fluid valving arrangement characterized in having a positive valve action in which the design parameters may be selected so that the valve is opened for only a predetermined arc of rotation. The valving arrangement will be explained in relation to an inlet function, although it is understood that the arrangement also has application for an outlet function. In this embodiment a base support 146 mounts a stator element 148 which in turn rotatably supports a secondary rotor 150 through ball bearing assembly 152. A primary rotor is mounted for conjoint rotation with the secondary rotor within the stator cavity according to the construction described above for rotary engine 20. The inlet porting arrangement is modified from that of engine 20 in that a relatively short length, axially extending inlet passage 154 is formed in rotor 150 and adapted to turn in registry with the open end of inlet conduit 156 leading from the desired fluid source and with the end of the adjacent inlet passage 158 formed in stator 148. Inlet passage 158 extends through the stator where it opens into the leading portion of the adjacent chamber through an inlet port. It will be appreciated that the valving arrangement of this embodiment eliminates the movement of the vane seals over the inlet/outlet ports. A similarly constructed valving arrangement would be provided on the opposite side of the engine for valving the fluid charge into the second chamber.

In operation, of the embodiment of FIG. 7 the pressurized inlet fluid, for example the gas under pressure, is directed into inlet conduit 156. With the rotor elements turning secondary rotor passage 154 moves into registry between inlet conduit 156 and stator passage 158 to direct a charge of gas through the aligned openings and into the expanding volume of the associated chamber. It will be seen that the rotor passage 154 turns in unison with its associated inlet port in the chamber and thus the charge is injected into the chamber only when the passage 154 moves into registry with inlet conduit 156. The volume and timing of the inlet charge may be adjusted according to particular requirements and specifications by appropriate sizing and positioning of the rotor passage 154 and/or inlet conduit 156. Thus, enlargement of the diameter of passage 154 functions to increase the exposure to the open end of inlet conduit 156 and thereby admit a greater charge volume into the chamber for one cycle. This valving arrangement finds application in, for example, a gas motor embodiment hereof so that the inlet circuit is open throughout a fraction of the rotational cycle for admitting a defined volume of pressurized gas, which then expands in the chambers to turn the rotors.

FIG. 8 illustrates another embodiment of the invention providing a modified fluid valving arrangement operating responsive to relative movement between the primary rotor 156 and stator 158. In this embodiment the rotor 156 is mounted for rotation about the stator by suitable ball bearing assemblies 160. A secondary rotor 162 is mounted for rotation about the stator through ball bearing assembly 164 for conjoint rotation with primary rotor 156, and with projecting vanes being provided in accordance with the construction of rotary engine 20 to produce expanding and contracting volumes within the cavity chambers. The valving arrangement will be explained in relation to an inlet function, although it is understood that the arrangement also has application for an outlet function. An inlet conduit 166 connects from a source of fluid into an inlet passage 168 formed in the stator and leading to a port 170 positioned at the mid-span of the stator axle about which primary rotor hub 172 revolves. An inlet passage 174 is formed within primary rotor 156 with an inlet end positioned to turn into registry with stator inlet port 170, together with an inlet port 176 opening into the leading portion of the associated chamber. A similar inlet valving construction, not shown, would be provided for the diametrically opposite chamber.

In operation of the embodiment of FIG. 8, the pressurized fluid, for example a compressed gas, is directed through inlet conduit 166 and into stator passage 168. Rotation of primary rotor 156 moves the inlet end of rotor passage 174 into registry with stator port 170 so that a charge of the fluid is admitted into the rotor passage where it issues from inlet port 176 into the chamber. Where the charge is a compressed gas it will expand within the chamber and act against the associated vane to produce a driving torque for turning the rotor elements. The timing and volume of the inlet charge may be varied in accordance with particular specifications and requirements by a selected design positioning and diameter of stator port 170 and/or rotor passage 174. For example, an increase in port 170 diameter produces an increase in the volume of the charge admitted into rotor passage 174 and the associated chamber for one cycle.

FIG. 9 illustrates generally at 178 another preferred rotary engine embodiment of the invention in which an output/input drive shaft 180 is keyed for rotation with third element primary rotor 182. The drive shaft is journalled for rotation within the annular cavity of a first element stator 184 by means of ball bearing assemblies 185. Stator 184 is anchored to an enclosing housing 186 which in turn is mounted by suitable means such as bolts to a base support 188. A second element or secondary rotor 190 of annular configuration is journalled for rotation about the stator by means of ball bearing assemblies 192. The rotational axis 194 of the primary rotor and shaft is disposed at an oblique angle C with respect to the rotational axis 196 of the secondary rotor in a manner similar to that explained above for rotary engine 20.

Secondary rotor element 190 is of annular configuration and may be constructed into sub-assemblies 198, 200 mounted together by suitable means such as bolts to facilitate assembly and disassembly.

Secondary rotor 190 carries partition means comprising a pair of diametrically opposed vanes 202, 204 which are mounted in suitable slots formed in the inner spherical surface 206 of this rotor with the vanes projecting radially inwardly into the annular stator cavity. While a pair of vanes are illustrated, it will be understood that the number of vanes could be greater than two with equal circumferential spacing, or only one vane could be provided, depending upon the desired number of volumes around the rotor.

Primary rotor 182 is formed in the shape of a disc with its outer rim defining a truncated section of a spherical surface for relative lateral sliding motion with respect to the inner surface 206 of the secondary rotor. The primary rotor is mounted for rotation with shaft 180 by suitable means such as the key 208 secured within facing keyways machined in the shaft and rotor opening 210 through which the shaft projects. The shaft projects from either side of the primary rotor through a bore 212 extending through the stator. The outer ends of the shaft are rotatably mounted within the stator by suitable bearing means such as the illustrated roller thrust bearing assemblies 214, 216.

The angular disposition of the plane of rotation for primary rotor 182 within the stator cavity divides the same into two diametrically and axially opposed chambers through which the conjointly moving rotor elements carry the vanes to create the expanding and contracting volumes in a manner similar to that explained above for rotary engine 20. The stator sidewalls within the cavity are formed with diametrically opposed flat surfaces 218, 220 each defining annular sectors positioned in close-spaced relationship with the opposed rotating flat surface of a respective side of primary rotor 182. The remaining portions of the stator sidewalls are formed into diametrically opposed surfaces 222, 224 each defining truncated segments of a conical surface. The conical surface portions of the stator sidewalls provide close-spaced relative motion with respect to the radial edges of the vanes as they are carried through the chambers.

Swivel seal means 226, 227 is provided to afford a swivel connection between the vanes and second and third elements to accommodate the relative swivel movement as the two rotor elements turn relative to the stator about their axes 194, 196. The swivel seal means comprise slotted cylinders 228, 230 of a construction similar to that provided for engine 20. These cylinders are seated within radially extending diametrically opposed bores formed in primary rotor 182 with respective slots of each cylinder adapted to slidably receive the corresponding vanes. As previously described, the vane movement throughout a complete cycle of rotation comprises a lateral sliding movement back and forth through the cylinder together with a swivel movement about radially extending axes.

The vane edges are sealed with respect to the stator sidewalls and primary rotor by means of suitable U-shaped seal elements 232, 234, which may be segmented, disposed in slots formed along each of the vane side edges and inwardly projecting edges. The vane edge seals function to seal the chambers in the manner explained above in connection with the first embodiment. Additionally, labyrinth type seals 236, 238 are provided for sealing the peripheral end edges of stator 184 with respect to the inside corner edges of secondary rotor 190. Suitable annular seals, not shown, similar to the seals 98, 100 described in connection with rotary engine 20 may be provided to seal the outer spherical surface of primary rotor 182 with respect to the inner spherical surface 206 of secondary rotor 190. A pair of annular labyrinth type seals 240, 242 are provided radially inwardly of the vanes and between the facing surfaces of stator 184 and primary rotor 182. The seals 240, 242 complete the sealing of the chambers by preventing escape of fluid into the space between the shaft and stator central opening.

Figure 10:
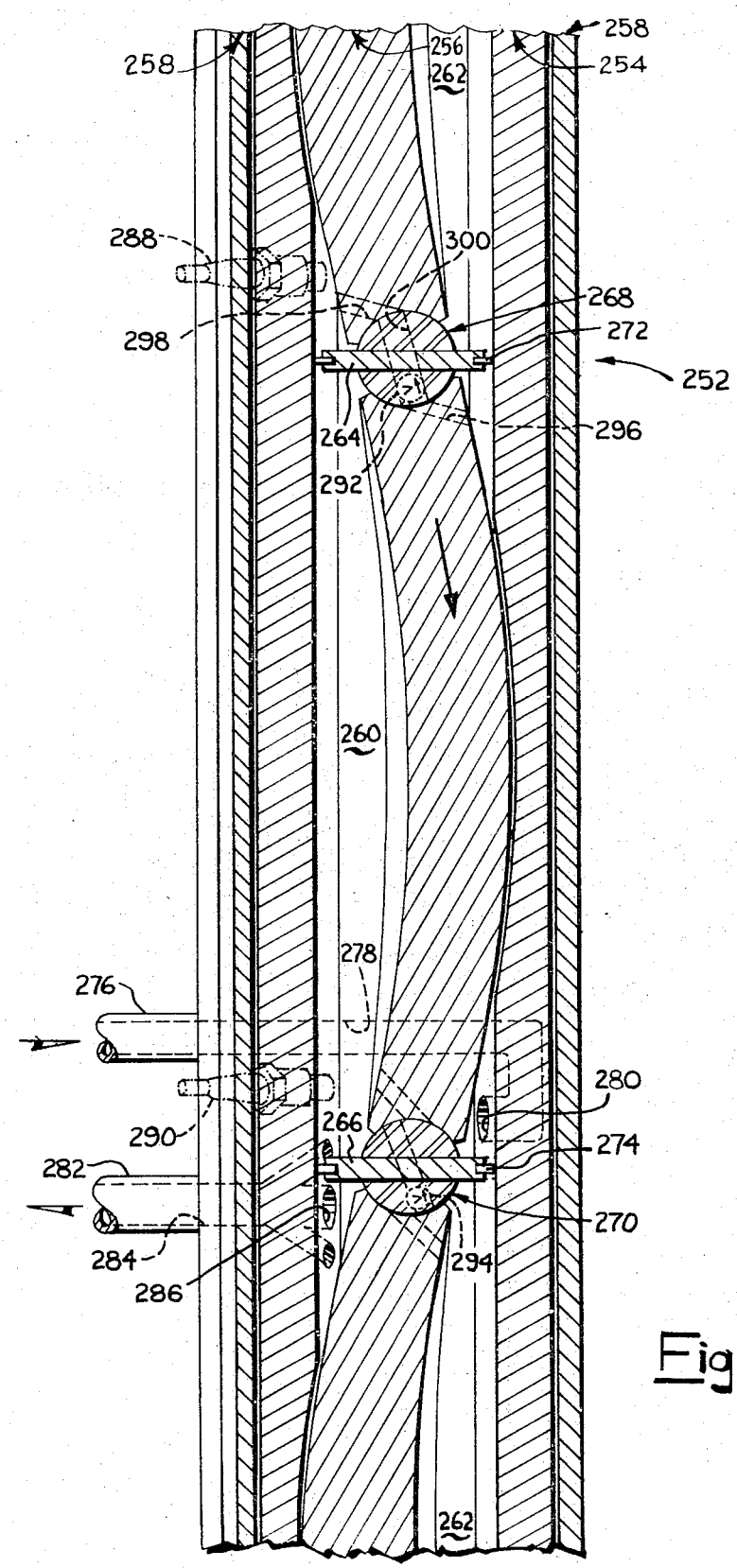
FIG. 10 is a schematic developmental view of an internal combustion engine embodiment of the invention.

Inlet and outlet means are provided to introduce and discharge fluid and/or gasses into the expanding and contracting volumes of the chambers, depending upon the particular application of rotary engine 178. For example, where engine 178 comprises an internal combustion engine embodiment as illustrated in FIG. 10, the inlet means comprises an inlet conduit 244 connected with an inlet passage 246 formed in the stator and leading to an inlet port which opens into the leading portion of one stator chamber. The outlet means comprises a discharge conduit 248 connected with a discharge passage 250 formed in the stator and leading from a port which opens into the trailing portion of the other of the stator chambers. Suitable valve means of the type described hereafter in connection with FIGS. 11 – 18 is provided to transfer the charge from the trailing portion of the chamber communicating with the inlet means across through primary rotor 182 and into the leading portion of the opposite chamber. In an internal combustion embodiment of the engine of FIG. 9 suitable ignition means of the type shown in FIG. 10 is provided to ignite a compressed fuel/air charge in the leading portion of the lastmentioned chamber to initiate the combustion phase of the cycle and produce the driving torque for turning the rotor elements and drive shaft.

FIG. 10 is a schematic developmental view of a rotary engine 252 providing an internal combustion engine embodiment of the invention. Rotary engine 152 may be adapted to embody the principles of either of the above described rotary engines 20 or 178, i.e., an engine of the type in which the power shaft is connected for rotation with the secondary rotor as in engine 20, or of the type in which the shaft is connected for rotation with the primary rotor as in engine 178.

Internal combustion engines 252 comprises a stator 254 defining an internal cavity adapted to contain a primary rotor 256 and secondary rotor 258. The two rotor elements are mounted for conjoint rotation about oblique axes and are arranged to divide the stator cavity into diametrically and axially opposed chambers 260, 262 in the manner previously explained. A pair of diametrically opposed vanes 264, 266 are carried in swivel seal means 268, 270 which in turn are mounted within the primary rotor. Suitable sealing means 272, 274 is provided to seal the vane edges with respect to the sides of the stator cavity. ttator Inlet means is provided comprising an inlet conduit 276 connected with a passage 278 leading to an inlet port 280 which opens into the leading portion of chamber 262, with the direction of rotor element movement being from top to bottom as viewed in FIG. 10. Inlet conduit 276 is connected with a suitable carburetor, where the inlet charge is a fuel/air mixture, or to a source of air where a fuel injection arrangement, not shown, is provided. Outlet means is provided comprising a discharge conduit 282 connected with a passage 284 leading from discharge ports 286 which open into the trailing portion of chamber 260 for discharging the spent gasses therefrom. As a modification, the compressed charge may pass into a third combustion chamber where ignition occurs, as in a diesel preignition chamber, and the expanding gas then would be valved into the expanding chamber.

Suitable ignition means is provided to ignite the compressed and transferred charge in the leading portion of chamber 260. This ignition means comprises a pair of spark plugs 288, 290 mounted at diametrically opposed positions on secondary rotor 258 immediately adjacent a respective swivel seal and vane location with the electrodes adapted to communicate with the chambers. A suitable timing arrangement, not shown, is provided to energize each ignition plug as the same is moved to a position relative to the stator as the compressed charge is transferred into the leading portion of chamber 260. Each plug thus fires one time for each revolution of the elements so that there are two combustion phases or power pulses for each such revolution.

Valving means is provided to transfer the compressed charge from the trailing portion of chamber 262 across to the leading portion of opposite chamber 260 prior to the combustion phase. The valving means includes a pair of flow control valves illustrated schematically at 292, 294. Each of the flow valves is positioned adjacent a respective one of the vanes 264, 266 and is adapted to open communication between the chambers 260 and 262 when the rotary elements move to a predetermined positional relationship with respect to the stator. In the embodiment of FIG. 10 this charge transfer would occur through valve 292 when vane 264 is in the illustrated position with respect to the stator, i.e., so that the charge which is compressed in the contracting volume in chamber 262 ahead of vane movement is transferred across into the expanding volume of chamber 260 trailing vane movement.

The flow valves 292, 294 may comprise one-way flow control valves of the poppet or reed type construction which would be adapted to open responsive to a predetermined build-up of charge pressure. The flow valves 292, 294 may also comprise the valving arrangements of FIGS. 11 through 18 which are actuated responsive to the particular positional relationships, depending upon the particular valving embodiment, assumed by the relative movement of the elements as they move through a given segment of the cycle of operation. It is understood that the following explanation of the operation of the flow valves for the internal combustion rotary engine 252 will have application to an engine of this type incorporating any one of these charge valving arrangements.

The flow valve 292 is typical, and it is understood that the following explanation has equal application to the construction and operation of valve 294. A flow passage 296 is formed on the side of primary rotor 256 with an outer opening communicating with chamber 262 ahead of the rotational sense of vane 264, and with an inner opening facing the cylinder of swivel seal means 268. Additionally, a flow passage 298 is formed on the opposite side of the primary rotor with an outer opening communicating with chamber 260 behind vane 264, and with an inner opening adjacent the cylinder of swivel seal 268. A transverse passage 300 is formed in the swivel seal cylinder and extends across the cylinder radially below vane 264. The opposite open ends of cylinder passage 300 are positioned to move into and out of registry with the adjacent ends of respective flow passages 296, 298 as the cylinder swivels relative to primary rotor 256. The cylinder passage 300 is precisely located such that this registry is established at the time that the two rotor elements move into a position relative to the stator where the transfer of the compressed charge is desired. When each flow valve 292, 294 is carried 189° from this position to the extreme opposite side, i.e., at the position for valve 294 shown in FIG. 10, the cylinder swivels to a position such that its associated transverse passage moves completely out of communication with the adjacent flow passages of the primary rotor.

The operation of internal combustion rotary engine 252 will be explained in relation to a suitable carburation arrangement for introducing a fuel/air charge into inlet conduit 276, although it is understood that the inlet charge could be air with suitable fuel injector means for the timed introduction of a precise charge of fuel into the leading portion of chamber 260. Relative rotation of the two rotor elements with respect to the stator sweeps vane 266 in the direction shown past inlet port 280 so that the expanding volume of the leading portion of chamber 262 inducts the charge from inlet conduit 276 into this chamber. This intake phase continues until a maximum volume of the charge is inducted. The following vane 264 then moves over and occludes intake port 280 to initiate the compression phase. Movement of this following vane creates the contracting volume in the trailing portion of chamber 262 and, at the same time, another intake charge will be inducted through inlet port 280 behind the movement of vane 264. Compression of the charge ahead of vane 264 continues with the cylinder of swivel seal 263 progressively turning until transverse passage 300 is in registry with the rotor flow passages 296, 298. The compressed charge then flows from the trailing portion of chamber 262 through these aligned passages and through flow valve 292 into the leading portion of chamber 260. The ignition timing mechanism then energizes spark plug 288 which combusts the compressed charge with the expanding gasses applying torque forces against vane 264 for turning the rotors. This combustion phase continues until vane 264 sweeps by and exposes outlet ports 286. The spent gasses exhaust through the outlet ports and discharge conduit 282, with the action of the following vane 266 serving to scavenge the waste gasses from chamber 260. At the same time that the leading face of vane 266 is scavenging to complete the exhaust phase, the trailing face of this vane is receiving the torque forces resulting from the next successive combustion phase in the leading portion of chamber 260. It is noted that because the two spark plugs turn with the rotors, the timing mechanism will function to energize the spark plug 290 when the vane 266 moves to the position 180° from that illustrated in FIG. 10.

Figure 12:
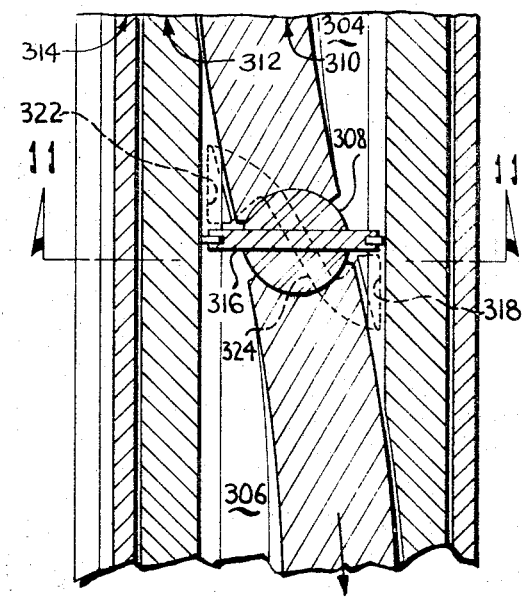
FIG. 12 is a developmental sectional view taken along the line 12—12 of FIG. 11.
Figure 11:
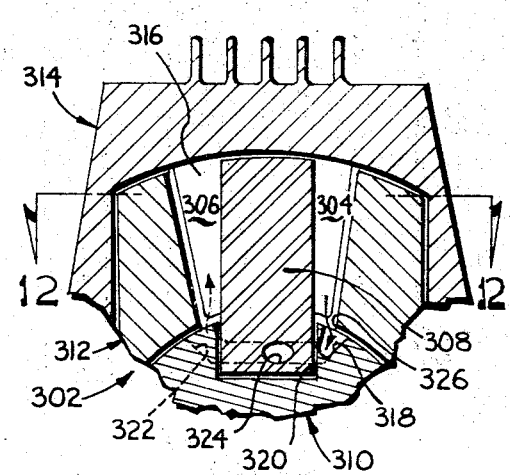
FIG. 11 is a fragmentary axial sectional view of another embodiment of the invention illustrating details of a valving arrangement.

FIGS. 11 and 12 illustrate another embodiment of the invention providing a valving arrangement of the type adapted for transferring the compressed charge between the two chambers at each of the vane locations in engine in engine embodiments hereof such as the internal combustion rotary engine 252 of FIG. 10. This embodiment of the valving arrangement is illustrated generally at 302 and is specially adapted to open and close communication between the trailing portion of a chamber 304 and the leading portion of an opposite chamber 306 responsive to the swivel movement of swivel seal cylinder 308 relative to the primary rotor 310 which it is mounted in. Primary rotor 310 in turn is journalled for rotation with respect to a stator 212, and a secondary rotor 314 if mounted for conjoint rotation with the primary rotor about respective oblique axes in the manner previously explained. A vane 316 is mounted to and projects inwardly from the secondary rotor and is adapted to slidably move within a transverse slot formed in cylinder 308.

Valving arrangement 302 includes an inlet passage 318 formed in primary rotor 310 and opening upwardly for communication with the chamber 304. The passage 318 opens inwardly into the lowermost portion of cylinder bore 320 at a position below the radial inward extent of vane 316. A passage 322 is formed on the other side of the primary rotor and opens upwardly for communication with chamber 306. The passage 322 extends inwardly to open into cylinder bore 320. A transverse passage 324 is formed in cylinder 308 with its opposite open ends adapted to move into and out of registry with the adjacent openings of the passages 318, 322. Cylinder passage 324 is precisely located so that it moves into registry with the rotor passages when the charge transfer is required, i.e., as the rotor elements move the vane 316 to the position illustrated in FIG. 12 with rotor movement being from top to bottom. At a rotor position 180° from that illustrated cylinder 308 will swivel to a position moving its passage 324 completely out of registry with the rotor passages 318, 322. When the three passages are in registry the charge, e.g., a compressed fuel/air charge, contained in the trailing portion of chamber 304 will be transferred under pressure across to the leading portion of the opposite chamber 306. The desired timing of charge transfer through the three aligned passages is controlled by the relative lateral movement of stator rim 326 with respect to rotor passage 318. This relative lateral movement progresses back and forth throughout a complete cycle of rotation as a result of the geometry of the rotating elements. Thus, movement of the primary rotor carries passage 318 into the region of chamber 304 such that stator rim 326 has the effect of receding away from and exposing passage 318. Movement of the rotor elements throughout the remaining circle of travel carries the passage 318 under stator rim 326 so that the passage is occluded and charge transfer cannot take place even though the three passages may be in communication.

Figure 13:
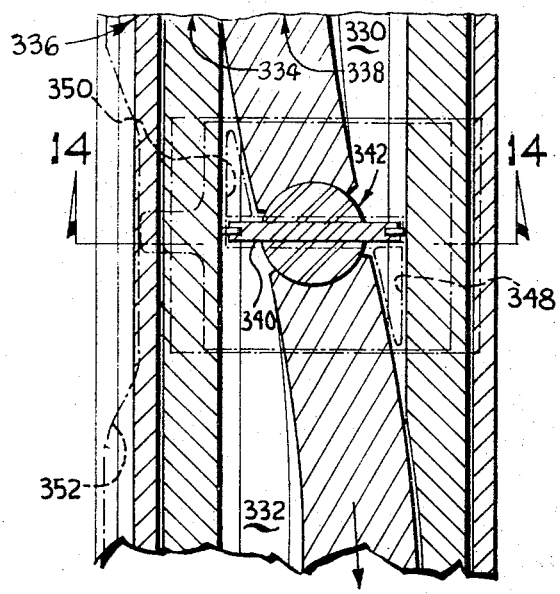
FIG. 13 is a fragmentary developmental view of another embodiment of the invention illustrating details of a valving arrangement.
Figure 14:
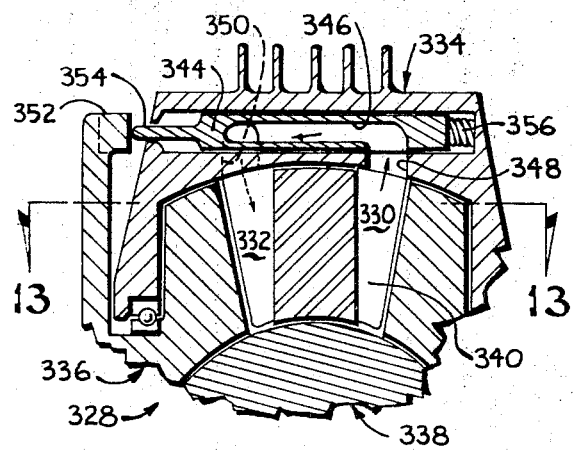
FIG. 14 is a fragmentary axial sectional view taken along the line 14—14 of FIG. 13.

FIGS. 13 and 14 illustrate another embodiment providing a valving arrangement 328 which is specially adapted to transfer a charge from a chamber 330 to an opposite chamber 332 responsive to the relative movement of the secondary rotor 334 with respect to stator 336, and would find application, for example, as the charge flow valve in internal combustion rotary engine 252. A primary rotor 338 is mounted for conjoint rotation with the secondary rotor about respective oblique axes in the manner previously described. One or more vanes 340 are mounted to and project inwardly for the secondary rotor, with swivel seal means 342 being provided to accommodate the relative swivel movement of the vane. A valve plate 344 is mounted within the outer rim of secondary rotor 334 for transverse sliding movement at a position adjacent to and above each of the vanes 340. The valve plate is formed with a passage 346 having an inlet opening adapted to move into registry with a passage 348 formed in the secondary rotor and positioned in front of vane 340, with rotor movement being from top to bottom as viewed in FIG. 13, so as to communicate with chamber 330. The outlet end of valve plate passage 346 is adapted to move into registry with a passage 350 formed in the secondary rotor in a direction behind vane movement and adapted to communicate with chamber 332.

Valve actuating means comprising a cam lobe 352 is affixed to the stator and positioned at a predetermined location relative to a cam follower 354 extending outwardly from valve plate 344. Cam lobe 352 is positioned such that it acts against follower 354 and shifts valve plate 344 to the right as viewed in FIG. 14 on the side of the stator where charge transfer is required, thereby moving the valve plate passage 346 into registry with rotor passages 348, 350. Spring means 356 is provided to urge valve plate 344 to the left as the cam lobe recedes through the remaining portion of the cycle of rotation. This shift of the valve plate moves the passage openings out of registry to occlude the flow path. The actuating means for returning the valve plate could also comprise a second cam and follower arrangement to provide positive return movement. Similarly, the actuating mechanism could comprise a track suitably formed in the stator with a follower, such as a roller, affixed to the valve plate and riding in the track.

FIGS. 15 and 16 illustrate another embodiment providing a valving arrangement 358 adapted to transfer a charge from a chamber 360 across to the opposite chamber 362 responsive to the relative movement between a primary rotor 364 and stator 366. A secondary rotor 368 is mounted for conjoint rotation with the primary rotor about respective oblique axes in the manner explained above. One or more vanes 370 are mounted to and project inwardly from the secondary rotor with swivel seal means 372 being provided to accommodate swivel movement of the vanes. An inlet passage 374 is formed in the primary rotor and is adapted to open upwardly into chamber 360 ahead of vane movement. Relative transverse movement of stator rim 376 as the primary rotor turns functions to expose this opening of passage 374 at the portion of the cycle where charge transfer is required, and to occlude this opening throughout the remaining portion of the cycle. An annular portion 378 of the stator projects into an annular recess in the primary rotor and is formed with a transverse passage 380. Movement of the primary rotor to the position at which charge transfer is required carries its passage 374 into registry with stator passage 380. At the same time the opposite end of the stator passage moves into registry with an outlet passage 382 formed in the primary rotor and which opens upwardly for communication with chamber 362 behind the vanes. With the three passages in registry, a compressed charge contained in the trailing portion of chamber 360 is forced through the passages into the leading portion of the opposite chamber 362. It will be appreciated that the valving action of this embodiment is purely a result of the relative rotation of the principal elements of the engine, without the requirement of separate moving valve parts.

FIG. 17 and 18 illustrate another embodiment providing a valving arrangement 384 adapted to transfer a charge from a chamber 386 to the opposite chamber 388, responsive to the relative movement between a vane 390 and its associated swivel seal 392. This relative movement in turn is a function of the relative position which primary rotor 394 assumes with respect to secondary rotor 396 as the two move in conjoint rotation about respective oblique axes about a stator 398. A slotted cylinder 400 forming the swivel seal means is seated in a bore formed in the primary rotor and the facing walls of the slot are provided with a pair of radially extending grooves 402, 404 both of which open downwardly through the base of the cylinder. A U-shaped channel 406 is formed in primary rotor 394 below the base of the cylinder with the cylinder grooves adpated to move into and out of registry with channel 406 as the cylinder swivels about its longitudinal axis. An inlet passage 408 of formed in vane 390 with an opening in the forward face of the vane, with the direction of rotor movement being from top to bottom as viewed in FIG. 18, for communication with the trailing portion of chamber 386. The passage 408 extends partially through the vane with a reverse opening through the vane forward face which is adpated to move into and out of registry with the cylinder groove 404 as the vane slides back and forth through the slot. A smilar passage 410 is formed on the opposite side of the vane and which opens through the vane rear face into communication with the leading portion of chamber 388. The passage 410 extends partially through the vane with a reverse opening through the vane rear face which is adapted to move into and out of registry with the cylinder groove 402 as the vane slides back and forth through the slot.

It will be seen that the positional relationship of the elements is such that as the rotors move to the phase of the cycle at which charge transfer is required then the grooves and channels are in communication, while throughout the remaining phases of the cycle the passages are occluded so that no charge transfer can occur. Thus, as the elements move to the position illustrated at FIG. 18, vane 390 has moved transversely through the slot of cylinder 400 such that vane passages 408, 410 move into registry with cylinder grooves 404, 402. At the same time, cylinder 400 has swivelled about its longitudinal axis so that the cylinder grooves move into registry with the end of the U-shaped channel 406 of the primary rotor. At this time the compressed charge is forced through passage 408, groove 404, channel 406, groove 402, and passage 410 into the trailing portion of chamber 388. When the rotor elements turn to the opposite side of the stator neither the vane passages nor the U-shaped channel of the primary rotor will line up with the cylinder grooves so that the flow passage is occluded.

FIGS. 19–22 illustrate an embodiment of the invention providing a rotary engine 412 characterized in that the working chambers are enclosed on three sides by a ring rotor 414 which is rotatably mounted on ball bearing assemblies 416, 418 about the longitudinal axis of a stator 420. The stator in turn is anchored by suitable brackets 422, 424 to a base support. The opposed inner sidewalls of the ring rotor define truncated sections of conical surfaces. A primary rotor 426 is mounted for conjoint rotation with the ring rotor on roller bearing assembly 428 about a stator shank segment 430 which is inclined along an axis obliquely intersecting the longitudinal axis of the stator.

Figure 21:
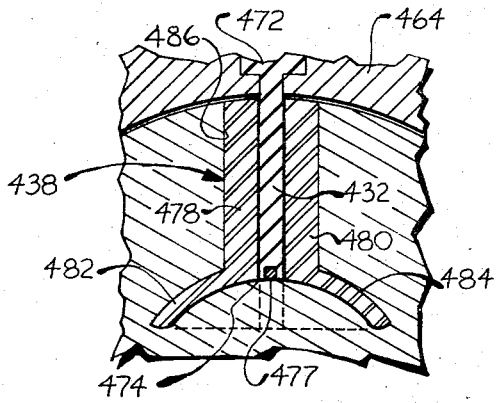
FIG. 21 is a fragmentary cross-sectional view of the vane and swivel seal taken along the line 21—21 of FIG. 19.

A single vane 432 is mounted in the outer wall of the ring rotor and projects into the working chambers. The radially extending vane side edges 434, 436 are mounted in sealed relationship in slots formed radially along the inner sidewalls of rotor 414. This construction obviates the requirement for sealing relative moving surfaces at the vane edges. A cylindrical swivel seal 438, FIGS. 21 and 22, is provided to form a combined sliding and pivoting sealed connection between the vane and primary rotor, as explained in detail hereinafter.

The of engine 412 is specially adapted in the illustrated form as an air or gas compressor, although it is understood that the invention will also find application upon suitable modification in accordance with the foregoing description accompanying FIGS. 1 and 9 as an hydraulic pump or motor, vacuum pump, or internal combustion engine.

Figure 20:
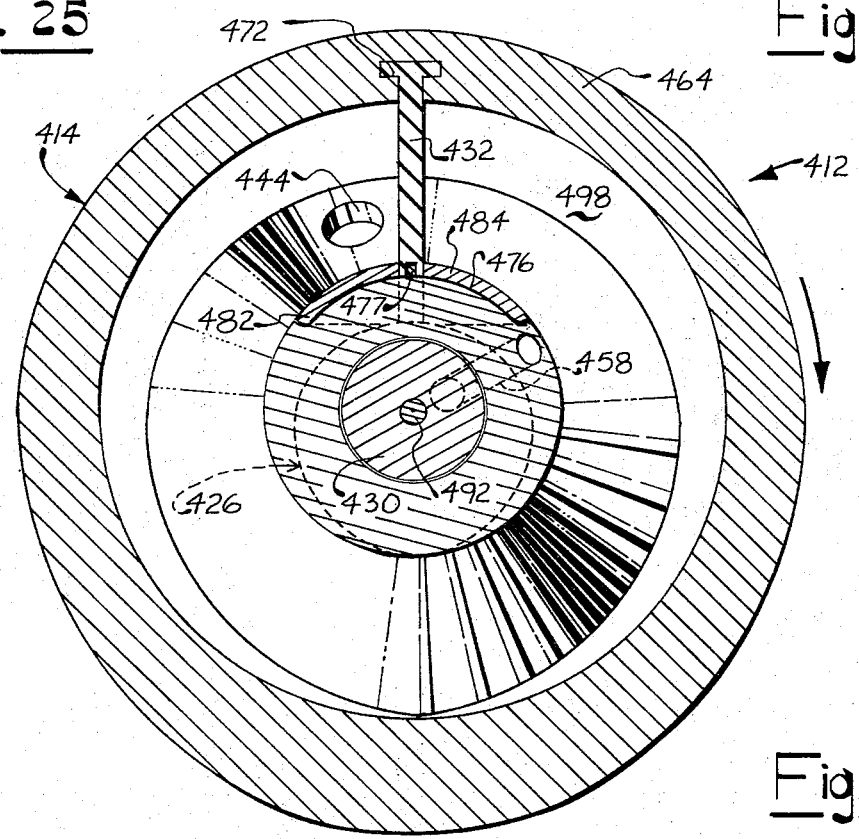
FIG. 20 is a cross-sectional view taken along the line 20—20 of FIG. 19.

In the illustrated gas compressor embodiment ring rotor 414 is rotatably powered by suitable means such as a series of drive pulleys mounted over pulley sheaves 440. Inlet air is directed into the working chambers through inlet ports 442, 444 formed in the opposed sidewalls of the ring rotor and positioned immediately behind the vane in the direction of rotation, as shown in FIG. 20. A pair of air scoops 446, 448 are mounted on the outer surfaces of the ring rotor sidewalls with the air scoops opening in the direction of rotation for purposes of increasing volumetric efficiency.

A pair of exhaust passages 450, 452 are formed in primary rotor 426, with each passage having an exhaust port opening into a respective working chamber on the forward side of the vane in the direction of rotation. Each exhaust passage has an outlet port opening radially inwardly through a central bore 454 formed through the primary rotor and rotatably mounted about the inclined stator shank 430. A pair of exhaust passages 456, 458 are formed in the stator with each passage including an inlet opening facing outwardly from the stator shank in registry with the outlet port of a respective rotor exhaust passage. Each passage 456, 458 has an outlet opening communicating with a respective connector fitting 460, 462 mounted on opposite end faces of the stator for connection with a suitable hose or conduit, not shown, leading to the desired end use application, such as a pressure storage tank.

Because the inlet openings of the stator passages are stationary, the relative movement of the outlet ports for the rotor passages serves as a rotary valving function controlling the flow of compressed gases from the chambers. Thus, the inlet openings of the stator exhaust passages are opened to the respective outlet ports of the rotor passages for a predetermined arc of rotation following the desired pressure build-up within the working chamber.

Ring rotor 414 is formed into two axially facing shells 464, 466 secured together by suitable means such as the circle of bolts 468. The inner peripheral surfaces of the two shells together define a truncated section of a spherical surface to accept the relative sliding movement of the outer peripheral surface of primary rotor 426 which in turn defines a truncated section of a spherical surface. Suitable sealing means, such as the pair of ring seals 470 mounted in annular grooves formed around the primary rotor, provide a fluid-tight seal between the two rotors.

As best illustrated in FIGS. 20 and 21 vane 432 is formed at its top with a T-shaped cross-sectioned configuration adpated to seat in T-shaped slots 472 formed in the two shells 464, 466 of the ring rotor. The inwardly projecting tip 474 of the vane is arcuate for relative sliding movement with respective to the facing spherical surface of circular recess 476 formed on the hub of primary rotor 426 around the base of swivel seal 438. A suitable arcuate sealing element 477 is seated within a groove in the tip of the vane to seal against recess 476.

Swivel seal 438 is formed of two half segments 478, 480 which together defined a radially extending cylinder having shoulders 482, 484 of spherical shell configuration adapted for back and forth pivoting or swivel movement about a radially extending axis throughout a full cycle of engine rotation. Each half segment is formed with an outer cylindrical surface seated in a cylindrical bore 486 formed in the primary rotor together with an inner flat surface juxtaposed in slidable relationship with a facing surface of the vane. The shoulders 482, 484 pivotally seat against the spherical outer surface of recess 476 in the hub of the primary rotor. This configuration affords a sealing function by creating a relatively long path for gasses to escape from between the swivel hub and rotor.

Stator 420 is of three-piece construction comprising the shank segment 430 and spaced apart end supports 488, 490. The opposite ends of the shank are seated in circular recesses formed in the end supports which in turn are mounted by brackets 422, 424 to the base support. A bolt 492 extending through aligned bores formed in the shank and end supports secures the three stator elements together as an integral unit.

The working volumes on the two sides of the primary rotor are sealed by the two ring seals 470, two ring seals 494, 496 seated in annular grooves formed in the inner edges of the ring rotor for sliding contact with the spherical surface on the hub of the primary rotor, and the arcuate vane tip seal 477 adapted for slding contact with the recessed surface 476 of the hub. As required, suitable sealing means may be provided along the tangential line of contact between the inner conical surfaces of the ring rotor and the flat faces of the primary rotor. For example, a close tolerance between the two rotors may provide the sealing, or a pair of discs, not shown, formed of suitable resiliantly deformable material, such as the polymer sold under the trade mark Teflon, may each be mounted to a respective face of the primary rotor for tangential line contact with the adjacent conical surface of the ring rotor. Other suitable sealing arrangements such as those described hereafter in relation to FIGS. 23-26 may also be employed for this purpose.

The use and operation of engine 412 in an air compressor application is illustrated in the developmental view of FIG. 22. For purposes of clearly showing the working volumes this view depicts primary rotor 426 as curved with ring rotor 414 linear. The rotors are powered to rotate in a direction from top to bottom as viewed in FIG. 22. Chamber 498 shown on the right of the primary rotor in the developmental view remains stationary with respect to the stator and is uppermost in FIG. 19, while chamber 500 on the left of the primary rotor also remains stationary and is lowermost in FIG. 19. As the two rotors turn in conjoint rotation vane 432 sweeps through the chambers. The vane slides back and forth through the slot in swivel seal 438 which in turn pivots back and forth within its seat in the primary rotor. The volumes of the two chambers behind the vanes in the direction of rotation are caused to expand while the volumes of the chambers ahead of the vanes are caused to contract. In the developmental view this action is best visualized by observing that the opposite lines of tangential contact 502 between the two rotors progress upwardly in a direction reverse of rotor movement. Air is inducted into the expanding chambers by the effect of reduced air pressure together with the ram effect of the air scoops.

After the vane passes the six o'clock position of FIG. 20 the expanding volumes of the two chambers behind vane movement causes air to be inducted through inlet ports 442, 444 while the contracting volumes ahead of vane movement compresses the contained air from a previous induction cycle. This compressed air is exhausted following movement of the rotors to a position where the outlet ports of passages 450, 452 in the primary rotor move into registry with the inlets of passages 456, 458 in the stator. These primary rotor outlet ports and stator inlets remain in registry for complete exhaust of the gases as the vane approaches the 6 o'clock position of FIG. 20.

Figure 21A:
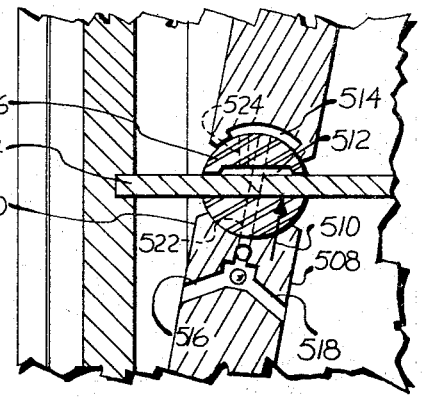
FIG. 21a is a fragmentary cross-sectional view of an embodiment employing means for relieving pressure forces on the vane and swivel seal.
Figure 19:
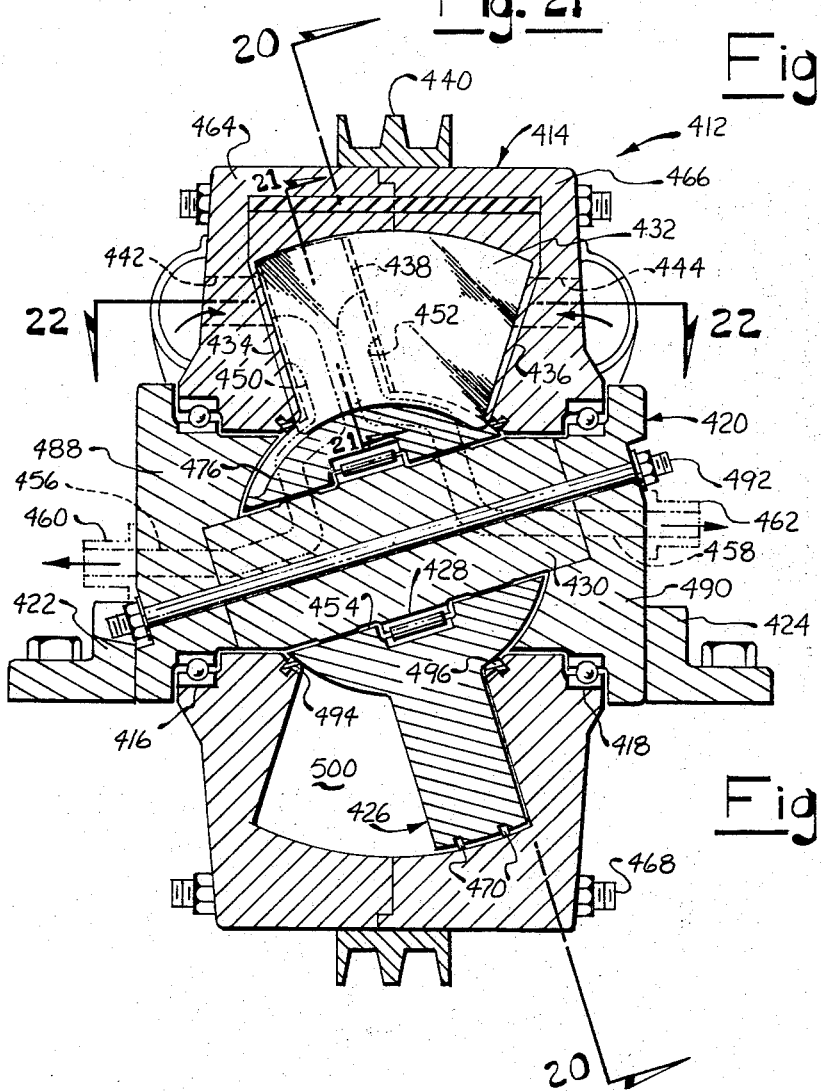
FIG. 19 is an axial sectional view of an embodiment in which an outer rotor defines the chamber walls and carries an inwardly projecting fixed vane.

The embodiment of FIG. 21a provides means for relieving the pressure forces acting on the vane and swivel seal elements. This embodiment will be described with particular reference to the gas compressor of engine 412, although it will become apparent that it will also have application in the remaining embodiments of the invention.

As the engine is operated the forces will arise primarily from the gas pressure differential on opposite sides of the vane create a resultant force 510 on the vane and trailing half cylinder 506 in a direction opposite that of rotor motion. With primary rotor 508 moving downward in FIG. 21a, this resultant force 510 is upward. The contact forces between the trailing surface of the vane and adjacent surface of the slot formed in the swivel seal, and the contact forces between the cylindrical surface of half cylinder 506 and the facing surface of its seat in the primary rotor, are unloaded by the provision of pressure relief chambers 512 and 514. Pressure chamber 512 in the half cylinder is formed by a radially extending recess in the wall of the slot facing the vane, and the chamber 514 is formed by a recess in the wall of the cylindrical seat of rotor 508. Fluid under pressure is communicated into the chambers to provide an opposing force acting in the direction of rotor movement. Preferably the fluid is the gas communicated from the working chambers of the engine, although the pressure could be hydraulic from a source such as an auxiliary pump or pressurized oil tank, not shown. Passages 516 and 518 are formed in the primary rotor ahead of the vane in the direction of rotation to communicate the high pressure gases from the contracting volume of each chamber into a three-way check valve 520. This valve directs the pressurized gas through a common passage 522 extending beneath the swivel seal and into chamber 514 formed in the primary rotor. Gas from this recess flows in turn through a passage 524 formed in half cylinder 506 and into chamber 512. In operation, three-way check valve 520 functions to control gas flow so that only the working chamber having the higher pressure is in communication with the two pressure relief chambers 512, 514 through the series of passages. This precludes gas flow across from one working chamber to the other. With the normal forces acting on the vane and half cylinder surfaces unloaded by the pressure within the relief chambers frictional forces acting on these surfaces is reduced.

FIGS. 23 and 24 illustrate an embodiment of the invention incorporating a rotor interface sealing arrangement. This embodiment is adapted for use with a rotary engine of the type described in FIG. 19 and which includes a stator 526 rotatably carrying a ring rotor 528 and primary rotor 530. One or more vanes and swivel seals, not shown, are mounted between the rotors in the form and manner previously described. A plurality of radially extending semi-cylindrical tapered grooves 532 are formed at circumferentially spaced positions along inner conical surfaces of both sidewalls of the ring rotor. A corresponding series of radially extending semi-cylindrical tapered grooves 534, 536 are formed in each side face of primary rotor 530, with each of these grooves being in registry with a respective one of the series of ring rotor grooves. A plurality of tapered dowel pins 538 are mounted in grooves 534 of the ring rotor. Each dowel pin is tapered to conform generally to the taper of the paris of facing grooves on the two rotors, but the pins are sized with a diameter less than the diameter of the grooves to afford lateral movement within the grooves.

Each dowel pin 538 is mounted with its small diameter end seated within a circular socket 540 formed within the ring rotor and facing radially outwardly. Aligned with each of the sockets is an opening 542 formed in the outer wall of the ring rotor and serving both to receive a pin for assembly and to loosely seat the large diameter end of the pin. Disc-shaped seals 544 are placed in the base of each socket 540 for seating against the small end of each pin, and similar disc seals 546 are seated against the large end of each pin, with the assembled elements held in place by threaded retainer caps 548. The axial thrust and frictional forces acting on the pins when assembled is sufficiently small to permit the pins to undergo limited lateral and rotary motion within the grooves.

In the use and operation of this embodiment it will be assumed that the rotor motion is from top to bottom as viewed in FIG. 24 with the line of tangential contact between the rotors progressing upwardly. As opposed portions of the two rotors move into the region of tangential line contact successive pairs of facing grooves 532 and 534 converge together. The volume of the working chamber between the approaching side portions of the rotors is contracting and the increasing pressure within this volume acts against the pin 532 disposed between the substantially closed pair of grooves. Because the pin is mounted for limited lateral and rotary movement, the pressure forces acting on the pin move it forwardly so that it bridges across and occludes the narrow gap between the forward edges of the two grooves. This serves to seal the working chamber from the escape of gas through this gap throughout a small arc of rotor movement. This seal is maintained until the next succeeding pair of facing grooves and associated pin move into position to create a similar seal so that a step-wise series of seals is achieved throughout a full cycle of rotation. The number of grooves and dowel pins which are provided for a particular application would depend upon variables such as the desired sealing efficiency and the particular fluids employed and pressures encountered.

Figure 25:
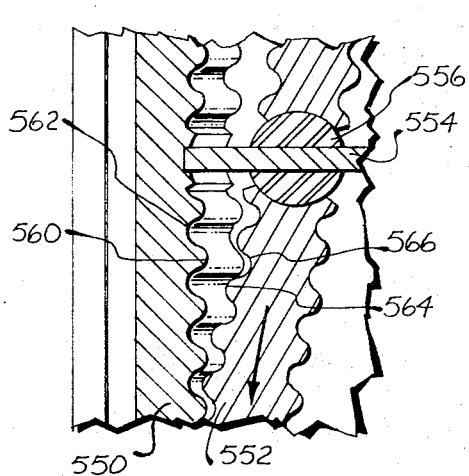
FIG. 25 is a fragmentary sectional view of an embodiment providing another chamber sealing arrangement.

FIG. 25 illustrates an embodiment of the invention providing another arrangement for effecting a seal at the lines of tangential contact between the two rotors. This sealing arrangment is adapted to be used with a rotary engine of the type described in FIG. 19 and which includes a ring rotor 550 and primary rotor 552 rotatably mounted about a stator, vane 554 and swivel seal 556. the inner surfaces of the ring rotor sidewalls 558 are formed with a series of radially extending convolutions defining a series of alternating lobes 560 and recesses 562. Each side face of primary rotor 552 is similarly formed with radially extending convolutions forming a series of alternating lobes 564 and recesses 566. The primary rotor convolutions are positioned with respect to the ring rotor convolutions such that the opposed lobes and recesses intermesh.

In operation, assuming that the rotors move from top to bottom when viewed in FIG. 25, the line of tangential contact between the rotors progresses upwardly so that the volume in the chamber ahead of the vane is contracting and compressing the contained fluid or gas. At the line of tangential contact the intermeshing lobes and recesses of the two rotors nest together to provide a substantially fluid-tight seal as a result of the substantial lengthening of the path which the gas must take to escpae between the opposing convolutions.

Figure 26:
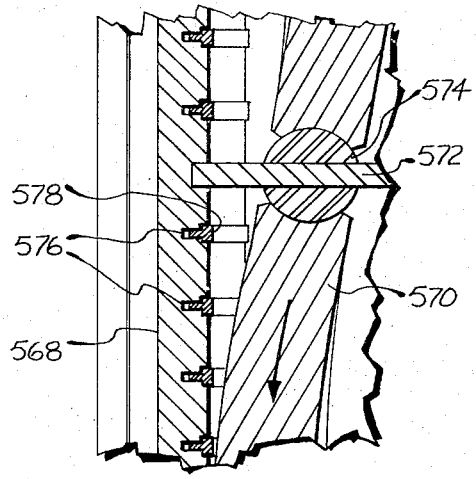
FIG. 26 is a fragmentary sectional view of an embodiment providing an additional chamber sealing arrangement.

FIG. 26 illustrates an embodiment providing another sealing arrangement. This sealing arrangement is also adapted for use with an engine of the type described in FIG. 19, and which includes a ring rotor 568, primary rotor 570, vane 572 and swivel seal 574. In this embodiment a plurality of radially elongate, circumferentially space-apart slots 576 having a T-shaped cross sectional configuration are formed along the inner surfaces of the ring rotor sidewalls. A plurality of radially elongate seal inserts 578 are provided with a T-shaped cross sectional configuration. Each of the inserts are seated within a respective slot 576 with the inserts being sized sufficiently smaller than the slot both to permit entry of pressurized fluid into the slots and to permit limited lateral movement for the inserts. A suitable end socket and retainer cap arrangement of the type described for restraining the dowel pins of FIG. 23 may be provided to seat and retain the inserts within their respective slots.

In the use and operation of this embodiment it will be assumed that the rotors move from top to bottom as viewed in FIG. 26 such that the volume of the chamber ahead of the vane is contracting to pressurized fluid or gas contained therein This fluid pressure is communicated into the base of slots 576 through the small clearance between the facing surfaces of the inserts and slots. The pressure in the slots acts against the inserts which are displaced along the major slot axis to bear against the face of the primary rotor in the region of the line of tangential contact between the two rotors. A step-wise series of seals is thus created at the line of contact throughout a full cycle of rotation. The number of slots and inserts which are provided for a particular application would depend upon variables such as the desired sealing efficiency and the particular fluids employed and pressures encountered.

Figure 27:
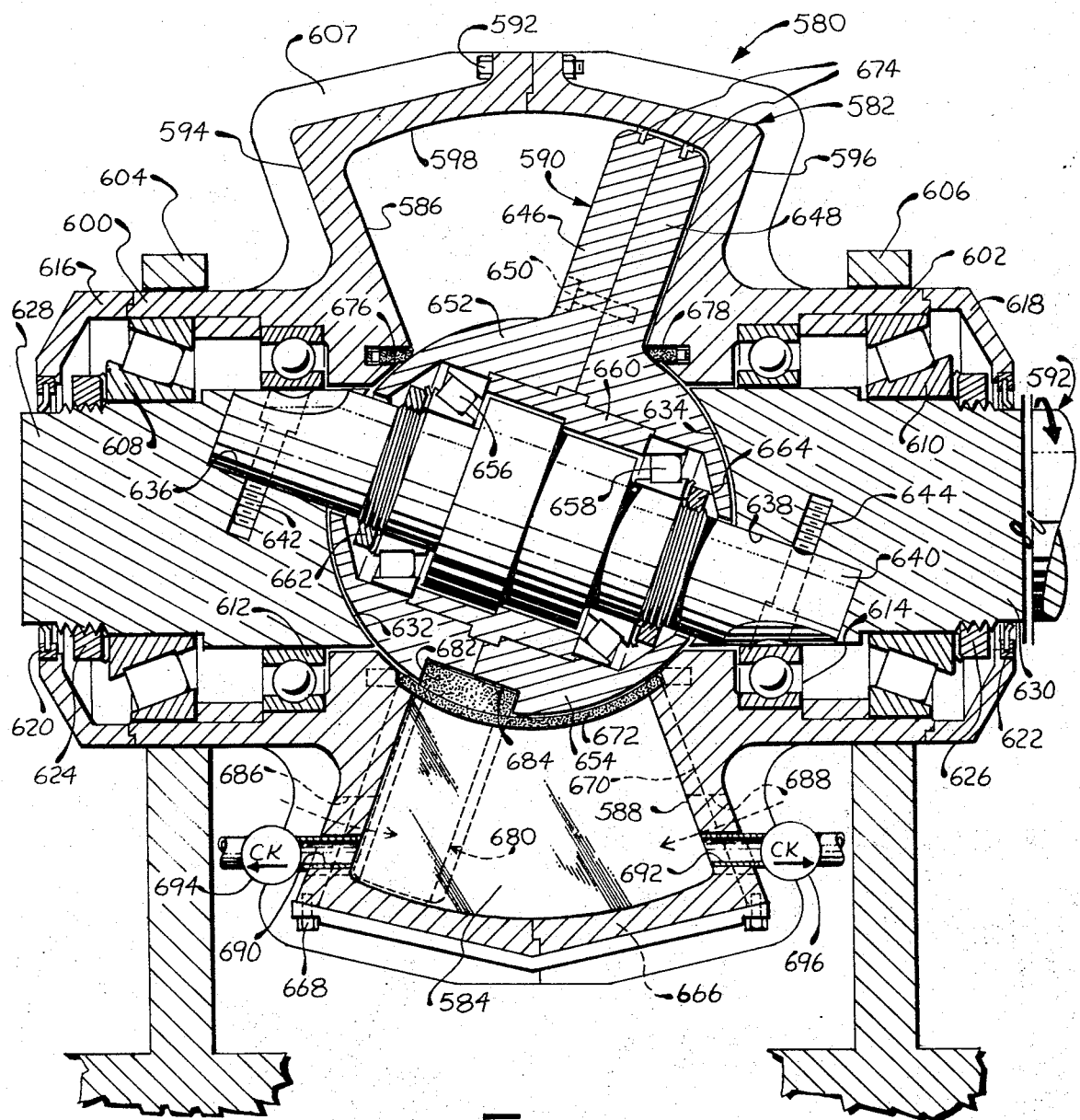
FIG. 27 is an axial sectional view of an embodiment employing processional-type motion.

FIG. 27 illustrates an embodiment of the invention providing an engine 580 employing precessional type motion. In this embodiment the engine is formed of three principal elements comprising a stator housing 582 carrying one or more partitions or vanes 584 and enclosing the two working chambers 586, 588, a disc 590 mounted for precessional type motion within the housing, and a power input/output shaft 592. Stator housing 582 corresponds generally to the second elements or ring rotors of the previously described rotary element embodiments, disc 590 corresponds to the previously described third elements or primary rotors and the shaft 592 corresponds to the previously described first elements or stators.

Stator housing 582 comprises a pair of annular shells 594, 596 secured together at a flanged rim by suitable means such as the circle of bolts 592. The two shells together defined an internal cavity formed with an outer peripheral wall 598 defining a section of a spherical surface and opposed side walls defining sections of a conical surface. Oppositely extending cylindrical portions 600, 602 of the housing are each mounted to a base structure by ring supports 604, 606. Cooling fins 607 are formed around the housing to dissipate heat.

Power shaft 592 is mounted for rotation about its longitudinal axis within housing 582 by means of an outer pair of roller bearing assemblies 608, 610 and inner pair of ball bearing assemblies 612, 614. A pair of end covers 616, 618 are secured to the projecting ends of the housing with suitable seals 620, 622 carried within central openings formed in the end covers for rotatable sealing contact with the power shaft. The inner races of the roller bearing assemblies are secured in place by suitable lock nuts 624, 626 turned onto threaded portions of the power shaft.

Power shaft 592 is shown as a three-part assembly, although the shaft could be an integral member. A pair of shaft end segments 628, 630 are provided with concavely facing spherical surfaces 632, 634 and opposed cylindrical bores 636, 638 disposed along a common axis obliquely intersecting at a predetermined angle with the longitudinal axis of the power shaft. A shank segment 640 is provided with opposed cylindrical ends seated within respective bores 636, 638 of the shaft end segments. The shank segment is secured to the end segments by suitable means such as bolts 642, 644 extending transversely through the shank and into threaded bores in the end segments. Additionally, dowel pins, not shown, may be provided for further strength in securing the power shaft elements together. The inner races of the ball bearing assemblies 612, 614 additionally serve to securely capture the ends of shank segemnt 640 in seated position within the bores of the shaft end segments.

Disc 590 is of two-part construction comprising a pair of annular members 646, 648 secured together by suitable means such as a circle of bolts 650. The annular members are formed with hub portions 652, 654 having outer surfaces formed as a section of a spherical surface and with central openings radially spaced about the shank segment of the power shaft. The shank segment is mounted for rotation about its longitudinal axis within the disc by means of the pair of roller bearing assemblies 656, 658 of the type adapted to support load forces having axial components. The outer races of these bearing assemblies are secured by means of spacer insert 660, and the inner races are secured by lock nuts 662, 664 turned onto threaded shoulders of the shank segment. Alternatively, disc 590 may be mounted for rotation with respect to the shank segment by axially spaced-apart bearing assemblies, not shown, mounted on either side of an annular flange which would extend around the mid-segment of the shank with these latter bearing assemblies adapted to support load forces having major components along the axial direction of the shank.

Vane 584 is mounted within a slot 666 in the outer wall of the stator housing by suitable fasteners 668, and the vane projects radially inwardly into the chamber with the vane side edges sealably seated in radially extending slots 670 formed along the inner sidewalls of the housing. The inner tip of the vane is sealed with respect to the spherical surface of the disc hubs 652, 654 by an arcuate vane tip seal 672 seated within a slot formed in the vane tip.

Additional sealing for the working chambers is provided by a pair of annular seals 674 seated in slots formed around the peripheral rim of the disc and urged into sliding sealable relationship with respect to the spherical surface of housing wall 598. A pair of annular seals 676, 678 are seated within annular slots formed at the inner margins of the two housing side walls, with these seals being urged by suitable spring loading means into sliding contact with the spherical sufaces of the two hubs 652, 654.

A swivel seal 680 is provided to afford a fluid-tight connection between the vane and disc. This swivel seal preferably is of the character described in relation to the embodiments in FIGS. 1 and 9 and comprises a radially extending cylinder 682 mounted within a cylindrical seat formed in the disc, with the swivel seal base projecting into a cylindrical recess 684 formed in hubs 652, 654. A transverse slot is formed through cylinder 682 to accept relative sliding movement of the vane. The base of this slot is arcuate for slidable sealing contact with vane tip seal 672. As desired, suitable pressure relief means such as the described in relation to the embodiment of FIG. 21a may be provided to unload the reaction forces acting at the interfaces between the disc, swivel seal and vane for reducing frictional forces.

Inlet and outlet means is provided to direct the working medium, e.g., air where engine 580 is used as a gas compressor as in the illustrated embodiment, into and from the chambers defined on opposite sides of disc 590. The inlet means comprises inlet ports 686, 688 projecting through opposite side walls of the stator housing and positioned ahead of vane 584 in the direction of precessional advance of the tangential lines of contact between the disc and housing side walls. It is to be noted that this direction of advance is in the directional sense of power shaft rotation. In the single vane embodiment of FIG. 27 no check valve means is required in the inlet path, although suitable air filters may be utilized, as desired. The outlet means comprises two outlet ports 690, 692 projecting through the opposite housing side walls into respective chambers 586, 588. The outlet ports are positioned behind the vanes in the direction of advance of the tangential lines of contact. One-way flow control means comprising check valves, 694, 696 are provided in the outlet ports. These check valves preclude gas backflow from the down stream line, such as from a pressure storage tank, permitting buildup of pressure within the contracting volumes of the chambers to a valve which exceeds tank pressure for opening the check valves.

Th use and operation of engine 580 will be explained in relation to the illustrated gas compressor embodiment where the shaft is powered to turn in a counter clockwise sense, as viewed from the right end of the shaft in FIG. 27. It will be seen that an opposite rotational sense for the power shaft will effect a reversal of the gas flow paths through the engine, that is the outlet ports would become the inlets while the inlet ports would become the outlets.

With the power shaft thus turning counter clockwise its shank segment 640 transmits power through bearing assemblies 656, 658, to disc 590. Because the disc is restrained from relative rotation with respect to the fixed vane and stator housing by means of swivel seal 680, the disc will undergo a precessional type movement within the housing. It will be noted that this motion is complementary to the movement of the rotary elements for the previously described embodiments, that is the volumes of the two chambers 586, 588 undergo alternate expansion ad contraction throughout a full cycle of rotation of the power shaft. As disc 590 undergoes this precessional type movement, swivel seal 680 moves back and forth along its slot across the vane, and at the same time the swivel seal pivots back and forth about its longitudinal axis throughout one complete cycle.

With the elements of engine 580 initially in the relative position as illustrated in FIG. 27, chamber 586 on the left hand side of disc 590 has reached its maximum volume immediately at the close of its induction phase and just prior to the start of its exhaust phase. At the same time chamber 588 on the right hand side of the disc is divided by the vane into a volume behind the vane, as viewed in FIG. 27, which is mid-way through its induction phase, and a volume on the opposite side of the vane which is mid-way through its exhaust phase. Continued counter clockwise rotation of the power shaft moves swivel seal 680 across the vane toward the opposite housing side wall. This causes the volume of the chamber on the left hnd side of disc 590 and behind the vane to expand and induct gas through inlet port 686. At the same time the volume of this chamber on the opposite side of the vane begins to contract and compress the contained volume of gas. Compresson continues until the gas pressure of this volume exceeds downstream tank pressure, whereupon check valve 694 opens to direct gas flow into the downstream circuit. After power shaft rotates 180° from the position initially described the disc has carried swivel seal 680 across the vane and immediately adjacent the opposite housing side wall so that the two volumes of chamber 588 on the right hand side have completed their respective induction and exhaust phases. Continued rotation of power shaft through a further 180° of its cycle causes the disc to continue its precessional type movement and carry swivel seal back across the vane toward its initial position adjacent the left side wall of the housing.

Figure 28:
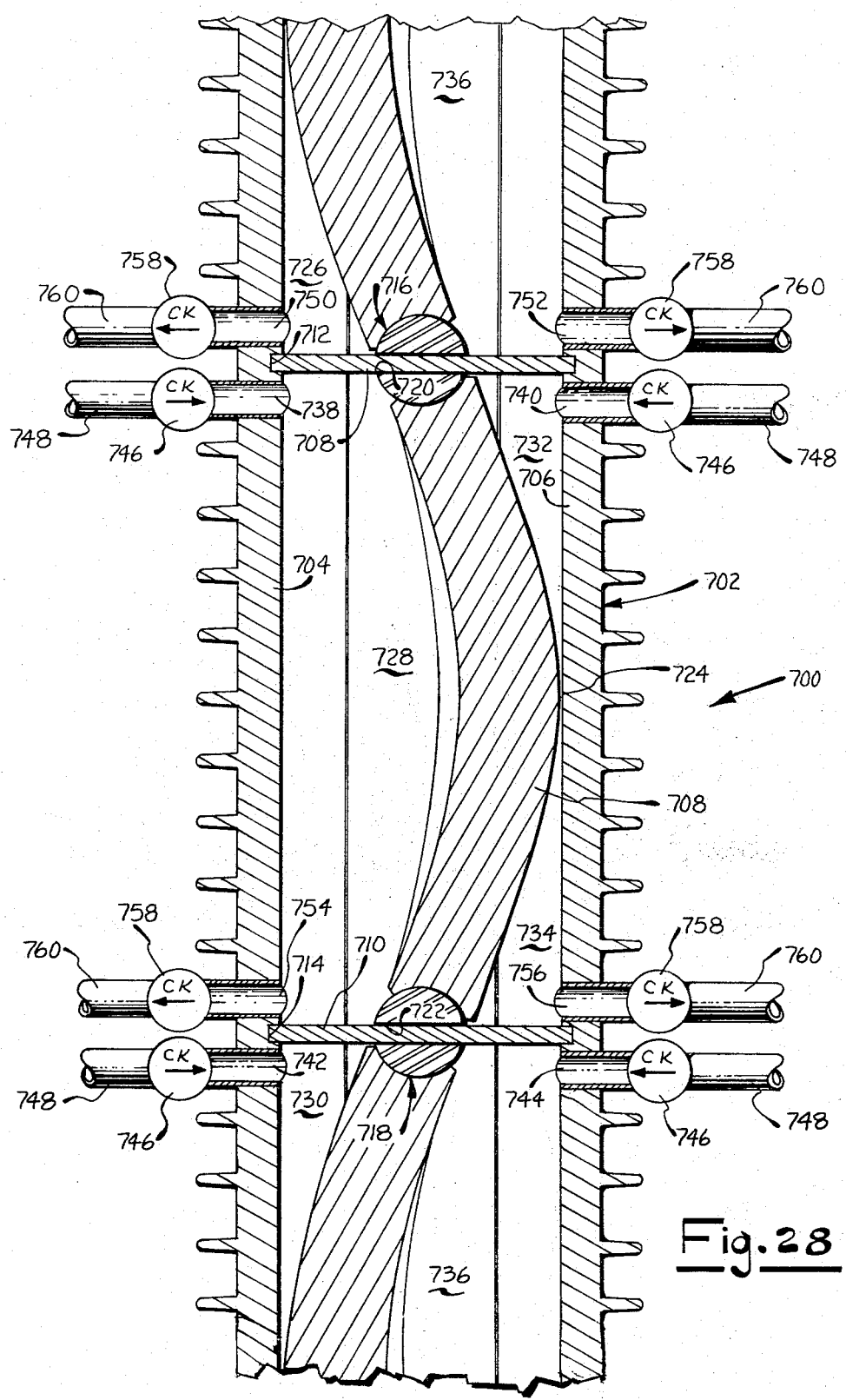
FIG. 28 is a developmental view partially in section of an embodiment similar to that of FIG. 27 but employing a two vane construction.

FIG. 28 illustrates in developmental view an embodiment of the invention providing a two-vane engine 700. Although this embodiment will be explained as applied to a gas compressor engine of the type described for that of FIG. 27, it will become apparent herein that the principles of this two-vane construction will also find application for the rotary element engine embodiment described for FIG. 19.

Engine 700 includes a fixed stator housing 702 having opposed conical side walls 704, 706 defining a cavity in which a disc is mounted for precessional type movement in the manner described for the embodiment of FIG. 27. A power shaft, not shown, is rotatably mounted about its longitudinal axis relative to the stator, and shank portion of the power shaft is rotatably mounted with respect to the disc about an axis obliquely intersecting the shaft axis. A pair of diametrically opposed vanes 708, 710 project inwardly from the outer wall of the stator housing, with the vane side edges seated within slots 712, 714 formed in the stator side walls. At each vane position cylindrical swivel seals 716, 718 are seated within radially extending bores formed in disc, and slots 720, 722 are provided in the cylinders to accept the relative sliding movement of the vanes.

The volumes within the stator housing on either side of disc 708 are sub-divided into expanding and contracting chambers by the two vanes 708, 710 in cooperation with the two lines of tangential 724 contact between the housing side walls and the opposing faces of the disc. As explained in detail in relation to the embodiment of FIG. 27, the precessional type movement of disc 708 as the power shaft turns causes the lines of tangential contact on either side of the disc to precess or move with respect to the housing in the direction of shaft rotation. For engine 700 the direction of shaft rotation is from top to bottom as viewed in FIG. 28. It will be seen that with the elements initially in the relative positions shown in FIG. 28 then on the left hand side of disc 708, the chamber 726 between the advancing left line of tangential contact and vane 708 is contracting, the chamber 728 between the two vanes diametrically opposite this line of contact has approached its maximum volume near the end of its induction phase and just prior to its exhaust phase, and the chamber 730 between vane 710 and this line of tangential contact is expanding at its start of its induction phase. Similarly, on the right side of the disc, chamber 732 between vane 708 and the right line of tangential contact is expanding, chamber 734 between this line of contact and vane 710 is contracting, and chamber 736 between the two vanes diametrically opposite this line of contact has approached its maximum volume near the end of its induction hase.

Inlet and outlet means are provided to control the flow of working medium, e.g., air where engine 700 is utilized as a compressor, into and from the chambers. At the two vane locations, inlet and outlet ports are provided in the stator housing on opposite sides of the vanes. Thus, inlet ports 738, 740 are formed in the opposed housing side walls 704, 706 on the side of vane 708 lying in the direction of power shaft rotation, and a similar pair of inlet ports 742, 744 are formed in the two side walls on the side of vane 710 lying in the same direction. One-way flow control means comprising suitable check valves 746 are provided in inlet conduits 748 leading into the four inlet ports to preclude backflow from the chambers. A pair of outlet ports 750, 752 are formed in the opposed housing side walls on the side of vane 708 lying behind the direction of power shaft rotation, and a similar pair of outlet ports 754, 756 are formed in the two side walls on the side of vane 710 lying in the same direction. One-way flow control means comprising suitable check valve 758 are provided in outlet conduits 760 leading from the outlet ports to preclude backflow into the chambers. For the two-vane engine construction of this embodiment the one-way flow control means are provided in the inlet circuit to preclude backflow through the inlet ports because for a portion of the operating cycle each adjacent pairs of inlet and outlet ports on either side of the disc lying between the vanes are in communication with the same chamber, for example, inlet port 738 and outlet port 754 both communicate into chamber 728 with the elements in the relative positions of FIG. 28.

In operation of engine 700 as an air compressor, with the power shaft turning in the illustrated top to bottom direction the two tangential lines of contact 724 between disc 708 and housing side walls 704, 706 precess from top to bottom relative to the housing. Chambers 732 and 730 behind the advancing lines of contact are expanding and induct air through check valves 746 and inlet ports 740, 742. At the same time chambers 726, 734 ahead of the direction of rotation of these lines of contact are contracting to compress the contained volume of air. When the pressures of these contracting volumes exceed the pressures downstream of check valves 758, for example, tank pressure, the check valves open and the compressed air is exhausted. Further precession of the disc from the illustrated position causes the chambers 728, 736 positioned diametrically opposite their respective lines of contact to undergo contraction and begin their exhaust phases. Until the disc precesses sufficiently so that the lines of contact occlude the two inlet ports, check valves 758 preclude backflow to permit the gas within the chambers to undergo the desired build-up of pressure. As these lines of contact continue and sweep by each vane position the exhaust phases are completed and additional induction phases are initiated.

From the foregoing it is apparent that applicant has provided a new and improved rotary engine adapted for a wide range of applications. The invention provides many advantages over existing engines of both reciprocating and rotary design. In the embodiments employing purely rotational movement for the elements a very high RPM limit is achieved with reduced friction and sealing problems. When used as an internal combustion engine, applicant's rotary engine provides important improvements. The torque characteristics are favorable in that major expansion forces act in the torque direction. The power-to-weight ratio is favorable in that the engine is relatively small for an equivalent combustion chamber volume. A wide range of compression ratios is available through a variation in the designed configuration for an engine of given size and weight. One axial side of the engine provides the combustion/exhaust phases, while the other sie provides the intake/compression phases, thus requiring cooling only on the combustion exhaust side, while the intake/compression side can be fabricated from selected materials affording lower friction and better sealing characteristics.

A significant reduction in the emissions of harmful pollutants is achieved in the internal combustion engine embodiment for a number of reasons. The engine provides high thermal efficiency and more complete combustion in that there is a relatively long power stroke with less blowdown loss, hotter combustion chamber walls with more complete charge burning, a favorable surface-volume ratio, and the adaptability for operation with a lean charge mixture and no-lead fuels. Furthermore, nitrogen oxide emissions will be less, in that lower compression ratios are possible, thus allowing lower combustion temperatures. Cooler exhaust temperatures are possible because of the separation of the power/exhaust phases from the intake compression phases so that there is less heat transfer of gasses from the engine surfaces. Cooling of the engine is facilitated in that cooling fins on the secondary rotor rotate through air as the cooling medium. The primary rotor and stator are adaptable to be cooled by water circulation. Lubrication is facilitated on the intake/compression side where the vane-stator seal elements can be formed of a lubricated sliding plastic-to-metal type seal, with the combustion/exhaust chambers sealed by suitable carbon type seals.

While the foregoing embodiments are at present considered to be preferred it will be understood that numerous variations and modifications may be made therein by those skilled in the art and it is intended to cover in the appended claims all such variations and modifications as fall within the true spirit and scope of the invention.

I claim:

1. A rotary engine comprising a first element, a second element mounted for relative rotation with respect to said first element about a first axis, a third element mounted for relative rotation with respect to said first element about a second axis intersecting said first axis at a predetermined oblique angular relationship therewith, means forming an annular cavity concentric with said first axis and with said third element disposed in a plane extending diagonally across said cavity to define diametrically disposed chambers, partition means extending radially across said cavity, swivel means to interconnect said partition means for relative movement with respect to said third element whereby relative rotation of said first element with respect to said second and third elements creates expanding and contracting volumes within said chambers on either side of said partition means, inlet means to direct fluid into at least one of the expanding volumes, and outlet means to discharge fluid from at least one of the cotracting volumes.

2. A rotary engine as in claim 1 in which said first element is formed with internal side walls defining a portion of said annular cavity, said third element is mounted within said cavity for conjoint rotation with said second element about said second axis, said partition means is mounted on said second element to project into said cavity, and said partition means is formed with side edges adapted for close-spaced relative motion with respect to at least a circular sector of respective first element side walls.

3. An engine as in claim 2 in which the swivel means comprises cylinder means mounted on said third element for swivel movement about a longitudinal axis extending radially of said third element, said cylinder means including means forming radially extending slots for receiving said partition means in slidable sealing relationship therewith.

4. An engine as in claim 2 in which diametrically opposed portions on opposed side walls of said first element define substantially flat surfaces in close-spaced relationship with an adjacent side of said third element, and with additional diametrically opposed portions of said walls defining truncated segments of a conical surface for providing said close-spaced relative motion with respect to said side edges of the partition means.

5. An engine as in claim 2 in which said partition means comprises at least a pair of diametrically opposed vanes mounted on the inner surface of said second element and extending radially inwardly therefrom, and said swivel means includes means forming radially extending slot means seating respective vanes in slidable sealing relationship therewith and adapted to accommodate an arc of swivel motion of said vanes with respect to said third element about radially extending axis during rotation of said second and third element with respect to said first element.

6. An engine as in claim 5 in which said first and second axes for the respective second and third elements are disposed at an oblique angular relationship which is associated in a predetermined relationship between the axial width of said vanes and axial width of said cavity so that a respective radial side edge of a vane moves alternatively into slidable relationship with diametrically opposed segments of facing side walls of said first element followed by movement in axially spaced-apart relationship with additional diametrically opposed segments of said facing side walls.

7. An engine as in claim 5 including means to selectively vary the radial inward extent of said vanes with respect to said second element.

8. An engine as in claim 2 in which said first element comprises a fixed stator, said third element comprises a primary rotor, together with power shaft means constrained for rotation with said third element for delivering or receiving power to or from the rotating elements.

9. An engine as in claim 8 in which said shaft means is co-axial with said second axis and extends through said stator, and said second element comprises an annular rotor journalled for rotation on said stator.

10. An engine as in claim 2 in which said first element comprises a fixed stator, said third element comprises a primary rotor journalled for rotation about said stator, and said second element is journalled for rotation with respect to said stator and includes shaft means for delivering or receiving power to or from said second element.

11. An engine as in claim 2 for use as a fluid pump or motor in which said cavity is formed into diametrically and axially opposed first and second chambers, said partition means comprises at least one vane means which moves through and separates respective and separates into said expanding and contracting volumes, said inlet means includes conduit means to direct a supply of fluid into said chambers on the ends thereof corresponding to said expanding volumes, and said outlet means includes additional conduit means to discharge fluid from the ends of said chambers corresponding to said contracting volumes.

12. An engine as in claim 11 which includes fluid valve means to control fluid flow through said inlet conduit means or through said additional conduit means.

13. An engine as in claim 12 in which the valve means controls flow through said inlet conduit means, the inlet conduit means is formed partially in said stator with axially spaced conduit portions between which the second element moves and said valve means includes passage means formed in the second element to move into and out of fluid communication between said conduit portions.

14. An engine as in claim 12 in which the inlet or additional conduit means is formed partially in said stator with a flow port, and said valve means includes passage means formed in the third element to move into and out of fluid communication between said port and chambers.

15. An engine as in claim 11 for use as a fluid motor including means to direct fluid under pressure into said first conduit means whereby the reaction force resulting therefrom within said chambers causes relative rotation of said second and third elements with respect to said first element.

16. An engine as in claim 11 for use as a fluid pump including power input means to impart relative rotation between said first element and said second and third elements whereby the contracting volumes of said chambers pressurize the fluid therein for discharge through said additional conduit means.

17. An engine as in claim 11 in which said first element comprises a fixed stator, said third element is journalled for rotation with respect to said stator, said second element is journalled for rotation with respect to said stator and includes means to rotate said second element for pumping fluid under pressure through said outlet means or to deliver power responsive to pressurized fluid directed through said inlet means.

18. An engine as in claim 17 wherein said inlet conduit means is formed in said stator and includes inlet ports opening into said chambers adjacent said expanding volumes thereof, and said outlet conduit means is formed in said stator and includes outlet ports opening into said chambers adjacent said contracting volumes thereof.

19. An engine as in claim 2 for use as an internal combustion engine in which said cavity defines diametrically and axially opposed first and second chambers, said partition means includes at least two partitions which move through and separate the chambers into said expanding and contracting volumes, said inlet means includes conduit means to direct a charge of air or a combustible gas mixture into the expanding volume of the first chamber behind the movement of one of said partitions whereby the movement of the next succeeding partition through the first chamber compresses the charge into said contracting volume, valve means to direct the compressed charge from the first chamber into the expanding volume of said second chamber behind movement of a partition therethrough, means to combust the charge in the expanding volume of said second chamber whereby the pressure of the combusted charge causes relative rotational movement between said first element and said second and third elements, and said outlet means includes conduit means to exhaust the combusted charge from the contracting volume of said second chamber.

20. An engine as in claim 19 in which said first element comprises a fixed stator, and said third element comprises a primary rotor including shaft means constrained for rotation with said primary rotor to delivery rotary power therefrom.

21. An engine as in claim 20 in which said shaft means is coaxial with said second axis and extends through said stator, and said second element comprises an annular rotor journalled for rotation about said stator.

22. An engine as in claim 19 in which said first element comprises a fixed stator, and said third element comprises a primary rotor journalled for rotation about said stator, said second element being journalled for rotation about said stator and including shaft means constrained for rotation with said second element to deliver rotary power therefrom.

23. An engine as in claim 22 in which said inlet means includes inlet conduit means formed in said stator and having an inlet port opening into said first chamber adjacent the expanding volume thereof, and said outlet means includes outlet conduit means formed in said stator and having an outlet port opening into said second chamber adjacent the contracting volume thereof.

24. An engine as in claim 19 in which said swivel means comprises cylinder means mounted in said third element for swivel movement about a longitudinal axis extending radially of said third element, said cylinder means including means defining radially extending slots for receiving said partitions whereby relative rotation of said first element with respect to said second and third elements causes said cylinder means to swivel about its longitudinal axis between extreme first and second positions, and said valve means includes channel means extending in fluid communication from the contracting volume of the first chamber to the expanding volume of the second chamber together with operating means to open and close communication through the channel means responsive to relative movement of the cylinder means.

25. An engine as in claim 24 in which said channel means is formed partially through a side of said third element adjacent one of said partitions and including an inlet opening adapted to move into communication with the contracting volume of said first chamber and an outlet opening adapted to move into communication with the expanding volume of said second chamber, said channel means further being formed partially in said cylinder means and positioned to establish fluid communication between said channel means inlet and outlet openings responsive to swivel movement of said cylinder means when the latter moves relative to said first element in the region of the contracting volume and expanding volume of respective first and second chambers.

26. An engine as in claim 24 in which said operating means is responsive to the relative position of one of said partitions with respect to the cylinder means, said channel means is formed partially in said one partition and includes an inlet opening adapted to move into communication with the contracting volume of said first chamber and an outlet opening adapted to move into communication with the expanding volume of said second chamber, and said channel means is formed partially in said cylinder means and establishes communication between said channel inlet and outlet openings responsive to relative sliding movement of the partition means with respect to said cylinder means when the latter moves into the region of the contracting and expanding volumes of respective first and second chambers.

27. An engine as in claim 19 in which said valve means includes channel means formed partially in the second element, together with an inlet opening communicating with the contracting volume of said first chamber and an outlet opening communicating with the expanding volume of said second chamber, and means to open and close communication between said inlet and outlet openings responsive to said second element rotating to a predetermined angular position with respect to said first element.

28. An engine as in claim 27 in which said means opening and closing communication between said inlet and outlet openings comprises a valve plate mounted for sliding movement on said second element between a first position opening said communication and a second position closing said communication, together with cam means to actuate said valve plate between said first and second positions responsive to relative rotation between said first and second elements.

29. An engine as in claim 19 in which said valve means includes channel means formed partially in said stator and including inlet and outlet openings therein which lie in the region adjacent to respective contracting and expanding volumes of respective first and second chambers, said channel means further being formed partially in said third element adjacent one of said partitions and including first and second channels establishing fluid communication between respective inlet and outlet openings and respective contracting volumes of the first chamber and expanding volumes of the second chamber responsive to relative rotational movement of said third element with respect to said first element.

30. An engine as in claim 1 in which said means forming the annular cavity includes axially spaced-apart side walls carried by said second element, and said third element is formed with annular side faces adapted to move into lines of tangential contact with diametrically opposed portions of said second element side walls.

31. An engine as in claim 30 for use as a gas compressor in which said first element comprises a fixed stator and said inlet means includes means forming inlet ports through said second element side walls positioned with respect to said partition means on the side thereof lying behind the direction of rotation of said second and third elements with respect to said stator.

32. An engine as in claim 30 in which said first element comprises a fixed stator, and said outlet means comprises exhaust passage means formed in said third element and having exhaust port means opening into said contracting volumes of the chambers and outlet port means, said outlet means further including additional exhaust passage means formed in said stator and having inlet and outlet opening means, said inlet opening means being positioned in registry with the path of movement of at least one of the third element exhaust passage outlet port means whereby relative rotation of the third element with respect to the stator controls the discharge of fluid from the chambers.

33. A rotary engine as in claim 30 in which said partition means comprises at least one vane secured to said second element, the outer edge of said vane being sealed with respect to the outer peripheral wall of said second element, and the radial side edges of said vane being sealed with respect to said second element side walls.

34. A rotary engine as in claim 1 in which said swivel means comprises means forming a swivel cylinder seated in said third element for back and forth swivel movement about a radially extending, longitudinal axis, means forming a slot in said cylinder means extending laterally across said annular cavity with said partition means being mounted for lateral slidable and sealable back and forth movement through said slot during said relative rotation of said elements.

35. A rotary engine as in claim 34 in which said third element is formed with a central hub portion with means forming a circular recess in said hub portion about the lower margin of said swivel means with the base of said recess having a spherical surface, and means forming a circular shoulder at the lower margin of said swivel cylinder, said shoulder being formed with a spherical shell configuration and being seated in said hub recess for relative sliding and pivotal movement therewith during said relative rotation of said elements.

36. A rotary engine as in claim 34 in which said partition means is formed with an arcuate inner tip, a cylindrical recess is formed in said third element at the radially inner base of said swivel cylinder, with the base of said swivel cylinder seated in said recess, and an arcuate surface is formed in said cylinder base along the lower margin of said slot for slidable sealing contact with the tip of said partition means.

37. A rotary engine as in claim 34 which includes pressure relief chamber means formed at either of the interfaces between a side of said swivel cylinder and an adjacent portion of said third element or between the slot of said swivel cylinder and an adjacent surface of said partition means, and means to communicate fluid under pressure into said chamber means to unload the normal forces acting at said interfaces during said relative rotation of said elements.

38. A rotary engine as in claim 37 in which said means communicating fluid comprises passageway means formed in said third element and having inlet means communicating with the contracting volumes of said chambers and outlet means communicating with said pressure relief chamber means.

39. A rotary engine as in claim 30 which includes means to form a fluid-tight seal between the volumes of said chambers on either side of said lines of tangential contact between the second and third elements, said last mentioned means comprising a plurality of radially extending, circumferentially spaced-apart sealing elements, and means to seat said sealing elements with said second element for limited lateral displacement therewith whereby fluid under pressure within said contracting volumes acts upon said sealing elements and urges the same into sealing relationship with the opposing side faces of said third element along said lines of tangential contact.

40. A rotary engine as in claim 39 in which said sealing elements each comprise elongate pins formed to taper with a smaller diameter at their radially inward ends, and said seating means comprises a plurality of radially extending, circumferentially spaced-apart grooves formed in said second element side walls together with a plurality of radially extending grooves formed in said third element side faces in registry with respective second element grooves, whereby said fluid under pressure urges said pins to occlude the clearance between two facing grooves between the second and third elements in the region of said lines of contact.

41. A rotary engine as in claim 39 in which said sealing elements comprise elongate inserts each formed with T-shaped cross-sectional configurations, and said seating means comprises a plurality of radially extending, circumferentially spaced-apart T-shaped slots formed along the inner surface of said second element side walls, each of said inserts being mounted for lateral displacement in a respective slot and with a clearance being provided between said inserts and slot side walls whereby pressurized fluid within the contracting volumes of said chambers communicates into said slots and urges the sealing inserts contained therein toward the third element side faces for sealing the volumes on either side of said lines of tangential contact.

42. A rotary engine as in claim 30 which includes means to form a fluid-tight seal between the chamber volumes on either side of said lines of tangential contact comprising means forming a plurality of radially extending, alternating lobes and recesses together forming a convoluted surface about the inner surface of said second element side walls, and means forming a plurality of radially extending, alternating lobes and recesses together forming a convoluted surface on the third element side faces, said third element lobes and recesses being adapted to move into seated relationship with opposed second element recesses and lobes in the region of said lines of tangential contact to form said fluid-tight seal.

43. A rotary engine as in claim 30 in which said partition means comprises a plurality of circumferentially spaced-apart vanes extending across the cavity of said second element, said inlet means include means forming inlet ports in said second element side walls positioned on the sides of said vanes lying in the direction of relative advance of said lines of tangential contact between said second and third elements, and said outlet means includes means forming outlet ports through said second element side walls and positioned on the sides of said vanes lying in the direction behind the advance of said lines of tangential contact.

44. A rotary engine as in claim 43 which includes one-way flow control means to direct inlet fluid through said inlet ports into the expanding volumes of the chambers associated therewith and additional one-way flow control means to direct exhaust fluid through said outlet ports from the contracting volumes of the chambers associated therewith.

45. A rotary engine as in claim 1 in which said second element comprises a fixed stator, and said third element comprises a disc mounted for precessional-type motion within said annular cavity responsive to said relative rotation of said elements, said precessional-type motion causing the advance of diametrically opposed lines of tangential contact between the disc and second element in the direction of rotation of said first element to create said expanding and contracting volumes.

46. A rotary engine as in claim 45 in which said partition means comprises at least one vane mounted to said second element, said inlet means includes means forming inlet ports through said second element and positioned on a side of said vane lying in the direction of advance of said lines of tangential contact, and said outlet means includes means forming outlet ports through said second element lying on a side of said vane behind the direction of advance of said lines of tangential contact.

47. A rotary engine as in claim 46 for use as a gas compressor which includes one-way flow control means to direct exhaust gases through said outlet ports from the contracting volumes of the chambers associated therewith.

48. A rotary engine as in claim 45 which includes bearing means mounting said first element for relative rotation with respect to said third element about said second axis, said bearing means supporting load forces having axial components.

* * * * *